(12) United States Patent
Irie et al.

(10) Patent No.: US 10,291,174 B2
(45) Date of Patent: May 14, 2019

(54) CONTROL APPARATUS FOR POWER CONVERSION APPARATUS

(71) Applicant: DENSO CORPORATION, Kariya, Aichi-pref. (JP)

(72) Inventors: Koji Irie, Kariya (JP); Hidekazu Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 68 days.

(21) Appl. No.: 15/595,002

(22) Filed: May 15, 2017

(65) Prior Publication Data

US 2017/0338764 A1 Nov. 23, 2017

(30) Foreign Application Priority Data

May 20, 2016 (JP) .................................. 2016-101788

(51) Int. Cl.
*H02P 29/50* (2016.01)
*H02M 3/02* (2006.01)
(Continued)

(52) U.S. Cl.
CPC .............. *H02P 29/50* (2016.02); *B60L 3/003* (2013.01); *B60L 15/007* (2013.01); *H02M 1/12* (2013.01);
(Continued)

(58) Field of Classification Search
CPC .... H02M 5/4585; H02M 5/458; H02M 5/447; H02M 5/45; H02M 5/4505; H02M 7/7575; H02M 7/42; H02M 1/12; H02M 1/15; H02M 3/02; Y02B 70/126; H02P 29/50; H02P 27/08; B60L 3/003; B60L 15/007

See application file for complete search history.

(56) References Cited

U.S. PATENT DOCUMENTS 5,473,240 A * 12/1995 Moreira .................. H02P 6/085
  318/400.13
5,594,630 A * 1/1997 Baker ....................... H02J 3/01
  307/105

(Continued)

FOREIGN PATENT DOCUMENTS

JP  5067325 B2  11/2012

*Primary Examiner* — Jue Zhang
*Assistant Examiner* — Kevin H Sprenger
(74) *Attorney, Agent, or Firm* — Oliff PLC

(57) ABSTRACT

In a control apparatus for a power conversion apparatus, a spectrum changing unit changes a spectrum of at least one of bus harmonic components and switch harmonic components so as to meet at least one of a separation condition and a reduction condition. The bus harmonic components are harmonic components superimposed on a voltage of the bus in accompaniment with on-off operations of switches configuring at least one power conversion apparatuses. The switch harmonic components are harmonic components included in a switching pattern of switches configuring the remaining at least one power conversion apparatus. The separation condition is that the frequencies of both harmonic components are separated by a predetermined value or more. The reduction condition is that an amplitude of at least one harmonic component is reduced when the difference between the frequencies of both harmonic components is less than the predetermined value.

16 Claims, 20 Drawing Sheets

(51) Int. Cl.
*H02M 7/42* (2006.01)
*H02P 27/08* (2006.01)
*H02M 1/12* (2006.01)
*H02M 1/15* (2006.01)
*B60L 3/00* (2019.01)
*B60L 15/00* (2006.01)
*H02P 5/74* (2006.01)
*H02M 7/5387* (2007.01)

(52) U.S. Cl.
CPC ............... *H02M 1/15* (2013.01); *H02M 3/02* (2013.01); *H02M 7/42* (2013.01); *H02P 5/74* (2013.01); *H02P 27/08* (2013.01); *H02P 27/085* (2013.01); *B60L 2210/10* (2013.01); *B60L 2210/40* (2013.01); *B60L 2240/12* (2013.01); *B60L 2240/421* (2013.01); *B60L 2240/429* (2013.01); *B60L 2240/525* (2013.01); *B60L 2240/526* (2013.01); *H02M 7/5387* (2013.01); *Y02T 10/644* (2013.01); *Y02T 10/645* (2013.01); *Y02T 10/7216* (2013.01)

(56) References Cited

U.S. PATENT DOCUMENTS

| | | | | |
|---|---|---|---|---|
| 2002/0043968 | A1* | 4/2002 | Cheng | H02J 1/02 323/286 |
| 2011/0025240 | A1* | 2/2011 | Furukawa | B60L 11/1803 318/400.3 |
| 2013/0119901 | A1* | 5/2013 | Gries | H02M 1/12 318/400.3 |
| 2018/0154786 | A1* | 6/2018 | Wang | H02P 6/28 |

* cited by examiner

BUS VOLTAGE

SW SIGNAL

PHASE VOLTAGE

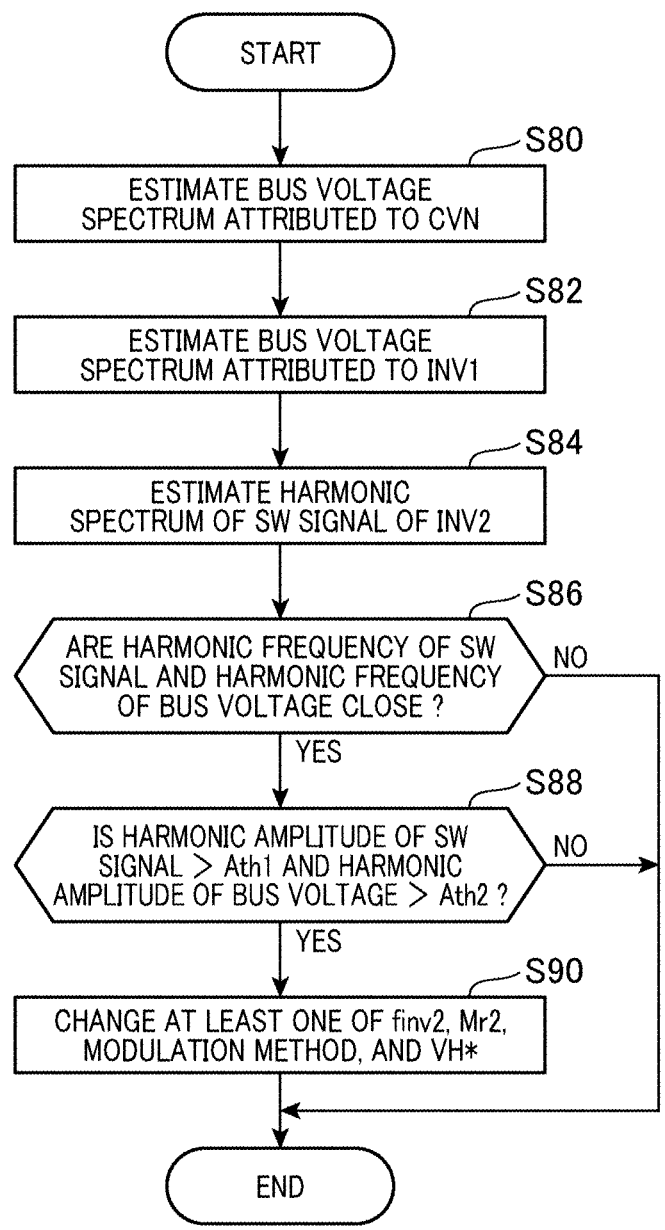

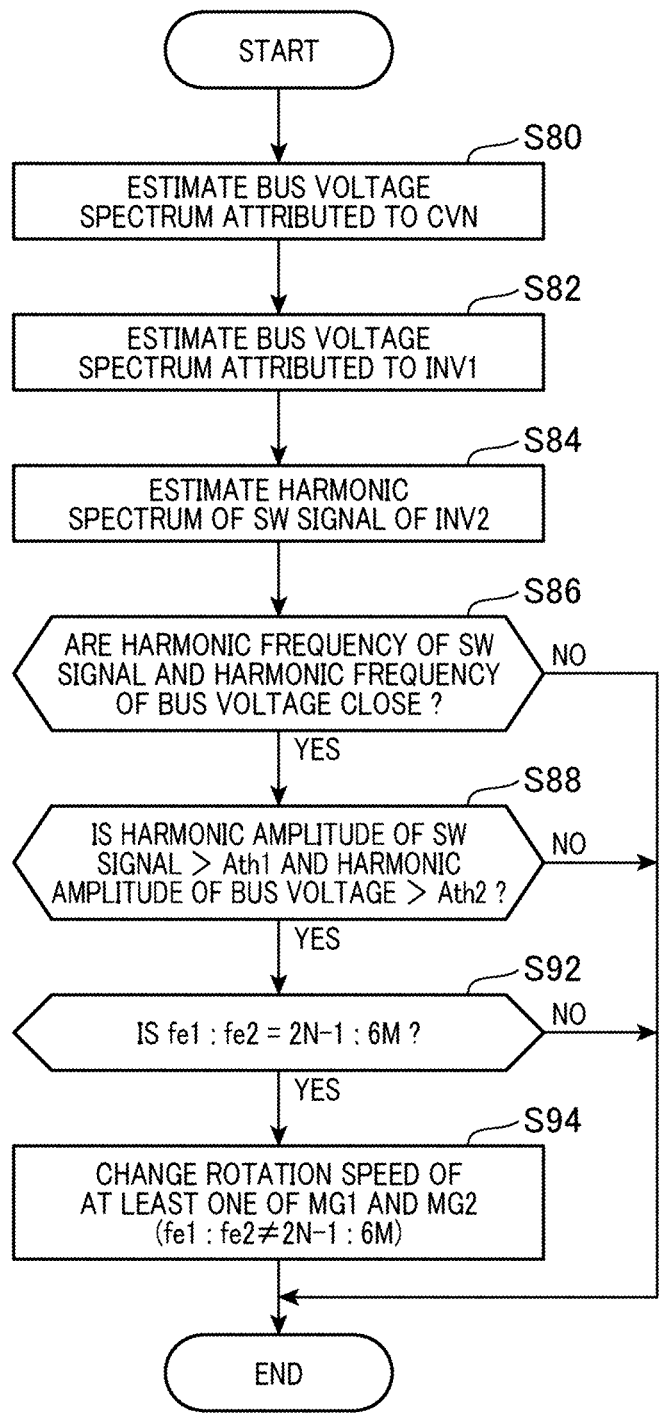

CONTROL APPARATUS FOR POWER CONVERSION APPARATUS

CROSS-REFERENCE TO RELATED APPLICATION

This application is based on and claims the benefit of priority from Japanese Patent Application No. 2016-101788, filed May 20, 2016. The entire disclosure of the above application is incorporated herein by reference.

BACKGROUND

Technical Field

The present disclosure relates to a control apparatus that is applied to a system including a plurality of power conversion apparatuses.

Related Art

As this type of control apparatus, a control apparatus that is applied to a system including a first inverter and a second inverter is known as described in Japanese Patent Publication No. 5067325. In the system, the first inverter is connected to a first rotating electric machine and the second inverter is connected to a second rotating electric machine. The control apparatus changes a carrier frequency used to control the second inverter towards a low frequency side, when determined that a single electrical angle cycle of the second rotating electric machine is six times greater than a single electrical angle cycle of the first rotating electric machine, and the first rotating electric machine is controlled by rectangular wave control. As a result, interference between control of the first inverter and control of the second inverter is suppressed. Fluctuations in output power of the inverters are thereby suppressed.

Here, a problem is that interference occurs between the control of the first inverter and the control of the second inverter, and fluctuations in the output power of the inverters increase may also occur in cases other than when the single electrical angle cycle of the second rotating electric machine is six times the single electrical angle cycle of the first rotating electric machine.

The above-described problem may similarly occur not only in the system including two inverters, but also in a system including a plurality of power conversion apparatuses in which the power conversion apparatus converts an input voltage to a predetermined voltage and outputs the predetermined voltage by turning on and off switches.

SUMMARY

It is thus desired to provide a control apparatus for a power conversion apparatus that is applied to a system including a plurality of power conversion apparatuses and is capable of suppressing fluctuations in output power of the power conversion apparatus.

An exemplary embodiment of the present disclosure provides a control apparatus for a power conversion apparatus that is applied to a system including a plurality of power conversion apparatuses that convert an input voltage to a predetermined voltage by turning on and off switches and output the predetermined voltage, in which the power conversion apparatuses are electrically connected to each other by a bus. The present disclosure includes an operating unit and a spectrum changing unit. The operating unit turns on and off the switches configuring the power conversion apparatuses. The spectrum changing unit changes a spectrum of at least one of bus harmonic components and switch harmonic components so as to meet at least one of a separation condition and a reduction condition. The bus harmonic components are harmonic components superimposed on a voltage of the bus in accompaniment with on-off operations of the switches configuring at least one power conversion apparatus among the plurality of power conversion apparatuses. The switch harmonic components are harmonic components included in a switching pattern of the switches configuring a remaining at least one power conversion apparatuses other than at least one power conversion apparatus among the plurality of power conversion apparatuses. The separation condition is that the frequency of the bus harmonic component and the frequency of the switch harmonic component are separated by a predetermined value (amount) or more. The reduction condition is that an amplitude of at least one of the bus harmonic component and the switch harmonic component is reduced when the difference between the frequency of the bus harmonic component and the frequency of the switch harmonic component is less than the predetermined value.

In the system to which the above-described exemplary embodiment is applied, the power conversion apparatuses are electrically connected to each other by a bus. In this system, when the switches configuring at least one power conversion apparatus (referred to, hereafter, as "interference source apparatuses") among the plurality of power conversion apparatuses are turned on and off by the operating unit, the bus harmonic components are superimposed on the voltage of the bus. In this case, the frequency of the bus harmonic component and the frequency of the switch harmonic component included in the switching pattern of the switches configuring a remaining power conversion apparatus (referred to, hereafter, as "interference receiving apparatuses") other than the interference source apparatuses may become close. At this time, a low-frequency harmonic component of which a fluctuation frequency is the difference between the frequency of the bus harmonic component and the frequency of the switch harmonic component or a value based on the difference is superimposed on the output voltage of the interference receiving apparatus. As a result, a problem may occur in that the output voltage of the interference receiving apparatus fluctuates.

Therefore, in the above-described exemplary embodiment, the spectrum of at least one of the bus harmonic components and the switch harmonic components is changed to meet at least one of the separation condition and the reduction condition. The separation condition is that the frequency of the bus harmonic component and the frequency of the switch harmonic component are separated by a predetermined value or more. As a result of the spectrum being changed to meet the separation condition, closeness between the frequency of the bus harmonic component and the frequency of the switch harmonic component can be prevented. As a result, superimposition of the low-frequency component can be prevented and fluctuations in the output power of the interference receiving apparatus can be suppressed.

Meanwhile, the reduction condition is that the amplitude of at least one of the bus harmonic component and the switch harmonic component is reduced when the difference between the frequency of the bus harmonic component and the frequency of the switch harmonic component is less than the predetermined value. When the amplitudes of harmonic components of which the respective frequencies are close are small, the amplitude of the low-frequency harmonic component of which the fluctuation frequency is the difference between the frequencies of the bus harmonic component and the switch harmonic component or a value based on the difference becomes small. As a result, the low-frequency harmonic component included in the output voltage of the interference receiving apparatus becomes small. Consequently, fluctuations in the output power of the interference receiving apparatus can be suppressed by the spectrum being changed to meet the reduction condition.

BRIEF DESCRIPTION OF THE DRAWINGS

In the accompanying drawings:

FIG. 20 is a flowchart of the steps in a process for changing a carrier frequency and the like;

FIG. 27 is a flowchart of the steps in a process for changing a carrier frequency and the like, according to a tenth embodiment.

DESCRIPTION OF THE EMBODIMENTS

First Embodiment

A first embodiment realizing a control apparatus of the present disclosure will hereinafter be described with reference to the drawings. The control apparatus according to the present embodiment configures a motor control system that is mounted to a vehicle, such as an electric car or a hybrid car.

Figure 1:
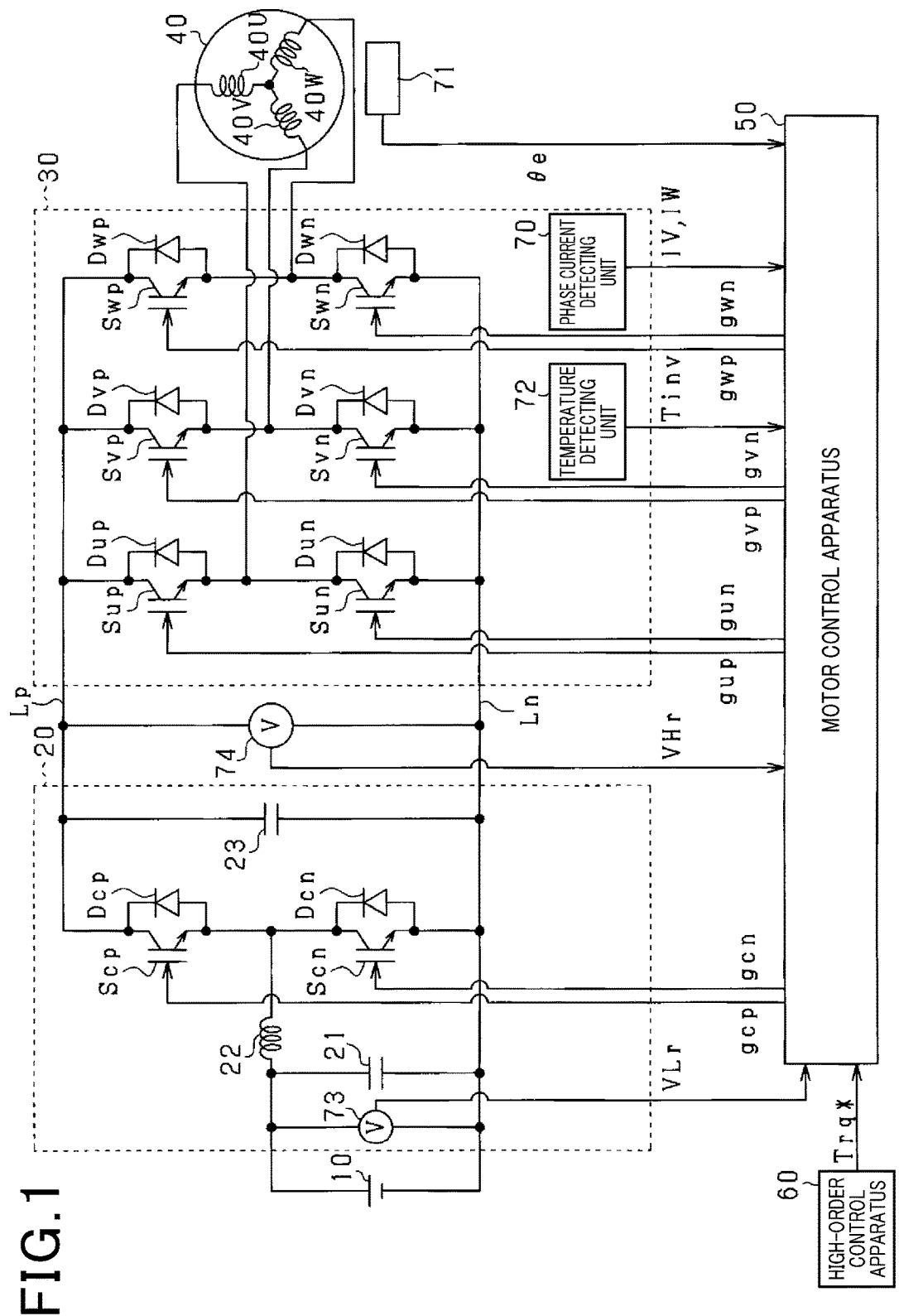
FIG. 1 is an overall configuration diagram of a motor control system according to a first embodiment.

As shown in FIG. 1, the control system includes a battery 10, a direct current-to-direct current (DC-DC) converter 20, an inverter 30, a motor generator 40, a motor control apparatus 50, and a high-order control apparatus 60. The battery 10 serves as a direct-current power supply. According to the present embodiment, the motor generator 40 is a main on-board engine. A rotor of the motor generator 40 is capable of performing power transmission with a drive wheel (not shown). According to the present embodiment, a synchronous motor is used as the motor generator 40. More specifically, an interior permanent magnet synchronous motor is used.

The DC-DC converter 20 includes a first capacitor 21, a reactor 22, and a second capacitor 23. The DC-DC converter 20 also includes an upper-arm transformer switch Scp and a lower-arm transformer switch Scn as converter switches. The DC-DC converter 20 provides a function for boosting an output voltage of the battery 10 with a predetermined voltage as an upper limit. According to the present embodiment, voltage-control type semiconductor switching elements are used as the transformer switches Scp and Scn. Specifically, insulated-gate bipolar transistors (IGBTs) are used. Freewheeling diodes Dcp and Dcn are respectively connected in inverse parallel to the transformer switches Scp and Scn.

A positive electrode bus Lp is connected to a collector of the upper-arm transformer switch Scp. The collector of the upper-arm transformer switch Scp is a high potential-side terminal. A collector of the lower-arm transformer switch Scn is connected to an emitter of the upper-arm transformer switch Scp. The emitter of the upper-arm transformer switch Scp is a low potential-side terminal. A negative electrode bus Ln is connected to an emitter of the lower-arm transformer switch Scn. For example, the buses Lp and Ln are configured by bus bars.

The second capacitor 23 is connected in parallel to a series-connection body composed of the upper-arm transformer switch Scp and the lower-arm transformer switch Scn. A first end of the reactor 22 is connected to a connection point between the upper-arm transformer switch Scp and the lower-arm transformer switch Scn. A positive terminal of the battery 10 is connected to a second end of the reactor 22. The emitter of the lower-arm transformer switch Scn is connected to a negative terminal of the battery 10. The first capacitor 21 is connected in parallel to the battery 10.

An input side of the inverter 30 is connected to the positive electrode bus Lp and the negative electrode bus Ln. The inverter 30 includes series-connection bodies for three phases. The series-connection bodies are composed of upper arm switches Sup, Svp, and Swp, and lower arm switches Sun, Svn, and Swn. The arm switches Sup to Swn correspond to inverter switches. According to the present embodiment, voltage-control type semiconductor switching elements are used as the switches Sup, Sun, Svp, Svn, Swp, and Swn. More specifically, IGBTs are used. Freewheeling diodes Dup, Dun, Dvp, Dvn, Dwp, and Dwn are respectively connected in inverse parallel to the switches Sup, Sun, Svp, Svn, Swp, and Swn.

The positive electrode bus Lp is connected to collectors of the upper arm switches Sup, Svp, and Swp. The collectors of the upper arm switches Sup, Svp, and Swp are high potential-side terminals. The negative electrode bus Ln is connected to emitters of the lower arm switches Sun, Svn, and Swn. The emitters of the lower arm switches Sun, Svn, and Swn are low potential-side terminals.

A first end of a U-phase winding 40U of the motor generator 40 is connected to a connection point between U-phase upper and lower arm switches Sup and Sun. A first end of a V-phase winding 40V of the motor generator 40 is connected to a connection point between V-phase upper and lower arm switches Svp and Svn. A first end of a W-phase winding 40W of the motor generator 40 is connected to a connection point between W-phase upper and lower arm switches Swp and Swn. Second ends of the U-phase winding 40U, the V-phase winding 40V, and the W-phase winding 40W are connected to a neutral point. The U-phase winding 40U, the V-phase winding 40V, and the W-phase winding 40W are shifted from each other by an electrical angle of 120 degrees.

The control system further includes a phase current detecting unit 70, an angle detecting unit 71, and an inverter temperature detecting unit 72. The phase current detecting unit 70 detects currents of at least two phases, among phase currents flowing to the motor generator 40. According to the present embodiment, the phase current detecting unit 70 detects the currents flowing to the V and W phases of the motor generator 40. The angle detecting unit 71 detects an electrical angle θe of the motor generator 40. For example, a resolver can be used as the angle detecting unit 71. The inverter temperature detecting unit 72 detects a temperature of the inverter 30. Specifically, for example, the inverter temperature detecting unit 72 detects the temperature of a switch that has the highest temperature during driving of the inverter 30, among the switches Sup to Swn configuring the inverter 30. For example, a temperature-sensitive diode or a thermistor can be used as the inverter temperature detecting unit 72.

The control system further includes a low-voltage detecting unit 73 and a high-voltage detecting unit 74. The low-voltage detecting unit 73 detects a cross-terminal voltage of the first capacitor 21 as an input voltage VLr of the DC-DC converter 20. The high-voltage detecting unit 74 detects a cross-terminal voltage of the second capacitor 23 as an output voltage VHr of the DC-DC converter 20.

The detection values of the various detecting units are inputted to the motor control apparatus 50. The motor control apparatus 50 is mainly configured by a microcomputer. The motor control apparatus 50 operates the DC-DC converter 20 and the inverter 30 to control a controlled variable of the motor generator 40 to a command value thereof. According to the present embodiment, the controlled variable is torque. The command value is a command torque Trq*. According to the present embodiment, the command torque Trq* is inputted to the motor control apparatus 50 from the high-order control apparatus 60. The high-order control apparatus 60 is provided in the vehicle, outside of the motor control apparatus 50. The high-order control apparatus 60 performs integrated control of the vehicle. According to the present embodiment, the motor control apparatus 50 corresponds to an inverter operating unit and a converter operating unit.

The motor control apparatus 50 generates operating signals gcp and gcn for turning on and off the transformer switches Scp and Scn configuring the DC-DC converter 20. The motor control apparatus 50 then outputs the generated operating signals gcp and gcn to the transformer switches Scp and Scn. The operating signal gcp of the upper-arm transformer switch Scp and the operating signal gcn of the lower-arm transformer switch Scn are mutually complementary signals. Therefore, the upper-arm transformer switch Scp and the lower-arm transformer switch Scn are alternately set to the ON state.

The motor control apparatus 50 generates operating signals gup, gun, gyp, gvn, gwp, and gwn for turning on and off the switches Sup, Sun, Svp, Svn, Swp, and Swn configuring the inverter 30. The motor control apparatus 50 then outputs the generated operating signals gup to gwn to the switches Sup to Swn. Here, the operating signals gup, gyp, and gwp for the upper arm side and the corresponding operating signals gun, gvn, and gwn for the lower arm side are mutually complementary signals. Therefore, the upper arm switches Sup, Svp, and Swp and the corresponding lower arm switches Sun, Svn, and Swn are alternately set to the ON state.

Next, a torque control process performed by the motor control apparatus 50 will be described with reference to FIG. 2.

First, processes related to the DC-DC converter 20 in the torque control process will be described.

A command voltage setting unit 50a sets a command output voltage VH* of the DC-DC converter 20. A voltage deviation calculating unit 50b calculates a voltage deviation ΔVH by subtracting the output voltage VHr detected by the high-voltage detecting unit 74 from the command output voltage VH*.

A feedback (FB) calculating unit 50c calculates a feedback command value Dcb as a manipulated variable for performing feedback control to control the voltage deviation ΔV to zero. For example, proportional-integral control may be used as the feedback control performed by the FB calculating unit 50c.

A feed-forward (FF) calculating unit 50d calculates a feed-forward command value Dcf as a feed-forward manipulated variable, based on the command output voltage VH* and the input voltage VLr detected by the low-voltage detecting unit 73.

A voltage adding unit 50e calculates a voltage-transformation command value Dcr as a value obtained by adding the feed-forward command value Dcf and the feedback command value Dcb.

A converter carrier generating unit 50f generates a converter carrier signal Scnv. According to the present embodiment, a triangular wave signal is used as the converter carrier signal Scnv. According to the present embodiment, a converter carrier frequency fcnv that is the frequency of the converter carrier signal Scnv is set to a fixed value.

A converter comparing unit 50g generates a converter pulse width modulation (PWM) signal GC by performing a PWM process based on a comparison of magnitude between the voltage-transformation command value Dcr and the converter carrier signal Scnv. The converter PWM signal GC is a binary signal. A converter signal generating unit 50h generates the operating signals gcp and gcn of the transformer switches Scp and Scn by performing a process to separate logic inversion timings of the converter PWM signal GC and a logic inverse signal thereof by dead time.

Next, processes related to the inverter 30 in the torque control process will be described.

A two-phase converting unit 51a converts a U-phase current IU, a V-phase current IV, and a W-phase current IW on a three-phase fixed coordinate system of the motor generator 40 to d- and q-axis currents Idr and Iqr on a dq-axis coordinate system. The dq-axis coordinate system is a two-phase rotary coordinate system. The two-phase converting unit 30a performs the conversion based on the V-phase current IV and the W-phase current IW detected by the phase current detecting unit 70, and the electrical angle θe detected by the angle detecting unit 71.

A speed calculating unit 51b calculates an electrical angular frequency ωs of the motor generator 40 based on the electrical angle θe. The electrical angular frequency ωs is an angular frequency of a fundamental component included in the output voltage of the inverter 30.

A torque controller 51c calculates a phase voltage δ and a command modulation factor Mr based on the command torque Trq*, the d- and q-axis currents Idr and Iqr, and the output voltage VHr of the DC-DC converter 20. The voltage phase δ is the phase of a voltage vector Vnvt on the dq-axis coordinate system. The voltage vector Vnvt is defined by a d-axis voltage Vd and a q-axis voltage Vq. The d-axis voltage Vd is a d-axis component of the voltage vector Vnvt on the dq-axis coordinate system. The q-axis voltage Vq is a q-axis component of the voltage vector. According to the present embodiment, with a positive direction of the d axis as reference, a counter-clockwise direction from the reference is defined as a positive direction of the voltage phase δ.

The command modulation factor Mr is a value obtained by a voltage amplitude Vr being normalized by the output voltage VHr. The voltage amplitude Vr is the magnitude of the voltage vector Vnvt. The voltage amplitude Vr is defined as a square root of a sum of a square of the d-axis voltage Vd and a square of the q-axis voltage Vq. According to the present embodiment, the command modulation factor Mr is calculated by an expression (eq1) below.

$$Mr = \frac{1}{\sqrt{1.5}} \frac{Vr}{\frac{VINV}{2}} \times 100 \qquad (eq\ 1)$$

An angle calculating unit 51d calculates an actual phase θe as a value obtained by adding the electrical angle θe to the voltage phase δ. The actual phase θe is the phase of the voltage vector Vnvt with reference to the fixed coordinate system. For example, the U phase of the fixed coordinate system can be used as reference for the fixed coordinate system.

A modulator 51e generates a U-phase command value DU, a V-phase command value DV, and a W-phase command value DW based on the actual phase θe outputted from the angle calculating unit 51d and the command modulation factor Mr. The U-phase command value DU, the V-phase command value DV, and the W-phase command value DW are shifted from each other by an electrical angle of 120 degrees. According to the present embodiment, the U-phase command value DU, the V-phase command value DV, and the W-phase command value DW correspond to a command value of the output voltage of the inverter 30.

An inverter carrier generating unit 51f generates an inverter carrier signal Sinv. According to the present embodiment, a triangular wave signal is used as the inverter carrier signal Sinv. According to the present embodiment, the inverter carrier generating unit 51f variably sets an inverter carrier frequency finv that is the frequency of the inverter carrier signal Sinv, based on the electrical angular frequency ωs.

Specifically, when the electrical angular frequency ωs is determined to be equal to or lower than a first switchover angular frequency ωa, the inverter carrier generating unit 51f sets the inverter carrier frequency finv to a fixed value to perform an asynchronous PWM process. According to the present embodiment, the inverter carrier frequency finv for the asynchronous PWM process is a value higher than the converter carrier frequency fcnv.

When the electrical angular frequency ωs is determined to be higher than the first switchover angular frequency ωa, the inverter carrier generating unit 51f sets the inverter carrier frequency finv for performing a synchronous PWM process.

An inverter comparing unit 51g generates a U-phase PWM signal GU, a V-phase PWM signal GV, and a W-phase PWM signal GW by performing a PWM process based on a comparison of magnitude between the U-phase command value DU, the V-phase command value DV, and the W-phase command value DW, and the inverter carrier signal Sinv. The U-phase PWM signal GU, the V-phase PWM signal GV, and the W-phase PWM signal GW are binary signals. According to the present embodiment, a three-phase modulation method is used in the PWM process.

An inverter signal generating unit 51h generates the operating signals gup, gun, gyp, gvn, gwp, and gwn of the switches Sup, Sun, Svp, Svn, Swp, and Swn by performing a process to separate logic inversion timings of the U-phase PWM signal GU, the V-phase PWM signal GV, and the W-phase PWM signal GW, and the logic inverse signals thereof by dead time.

Next, the method for setting the inverter carrier frequency finv will be further described. According to the present embodiment, the inverter carrier generating unit 51f variably sets the inverter carrier frequency finv such that an absolute value of the difference between the converter carrier frequency fcnv and the inverter carrier frequency finv is equal to or greater than a predetermined value (amount) Δf. The reason for use of this setting method will be described below, with reference to FIG. 3A to FIG. 3C.

Figure 3A:
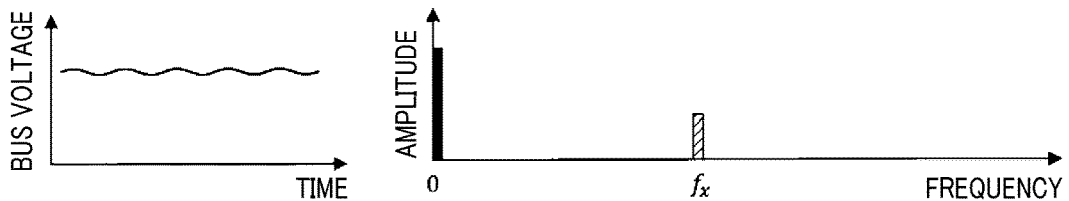
FIGS. 3A to 3C are diagrams of the effects of fluctuations in a bus voltage on inverter control.

As shown in FIG. 3A, harmonic components are superimposed on a bus voltage in accompaniment with the on-off operations of the transformer switches Scp and Scn. The bus voltage is the potential difference between the positive electrode bus Lp and the negative electrode bus Ln. The harmonic components superimposed on the bus voltage in accompaniment with the on-off operations of the transformer switches Scp and Scn will be referred to hereafter as DC bus harmonic components. FIG. 3A shows a DC bus harmonic component of which a fluctuation frequency is fx and a fundamental component included in the bus voltage.

Figure 3B:
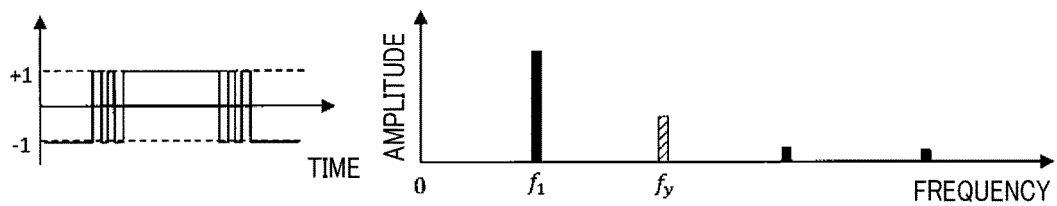

In addition, a switching pattern of the switches Sup to Swn configuring the inverter 30 includes switch harmonic components that are harmonic components. In the switching pattern shown in FIG. 3B, a "+1" signal is used to indicate an on-instruction signal. A "−1" signal, which differs from the logic value of the on-instruction signal, is used to indicate an off-instruction signal. The on-instruction signal gives an instruction to turn ON the upper arm switch and turn off the lower arm switch. The off-instruction signal gives an instruction to turn off the upper arm switch and turn on the lower arm switch. In addition, FIG. 3B shows a switch harmonic component of which the fluctuation frequency is fy, and a fundamental component included in the switching pattern and of which the fluctuation frequency is f1.

Figure 3C:
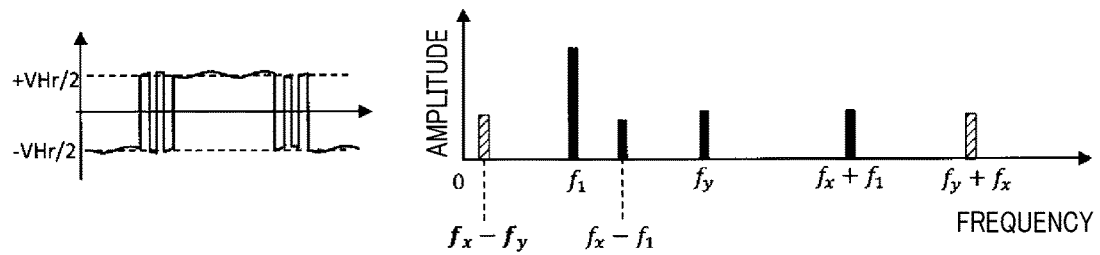

As shown in FIG. 3C, a phase voltage waveform for each phase of the inverter 30 that is outputted from the inverter 30 can be expressed as a product of the bus voltage and the switching pattern. Here, when the frequency fx of the DC bus harmonic component and the frequency fy of the switch harmonic component are close to each other, the phase voltage includes fluctuation components of which the difference and the sum of the frequencies fx and fy are fluctuation frequencies "fx−fy" and "fx+fy." FIG. 3C shows that the phase voltage also includes the fluctuation components of which the difference and the sum of the frequency fx of the DC bus harmonic component and the frequency f1 of the fundamental component included in the switching pattern are fluctuation frequencies "fx−f1" and "fx+f1."

The motor generator 40 that serves as a load of the inverter 30 is an inductive load mainly having an inductance component. Therefore, a phase current is expressed by an integral of the phase voltage and is inversely proportional to the fluctuation frequency of the phase voltage. As a result, of the fluctuation components included in the phase voltage, a fluctuation components having a lower frequency has a greater effect on fluctuations in the phase current. In the spectrum shown in FIG. 3C, of the fluctuation components included in the phase voltage, a low-order fluctuation component having the fluctuation frequency "fx−fy" has a greater effect on the fluctuations in the phase current. As a result, the output power of the inverter 30 significantly fluctuates and torque fluctuation in the motor generator 40 increases.

Figure 4A:
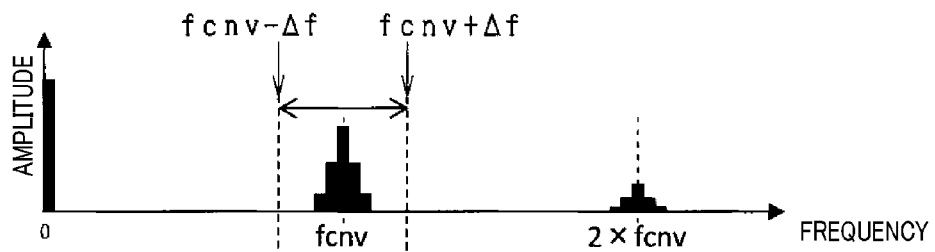
FIGS. 4A and 4B are diagrams of a spectrum of bus harmonic components and a spectrum of switch harmonic components of an inverter.
Figure 4B:
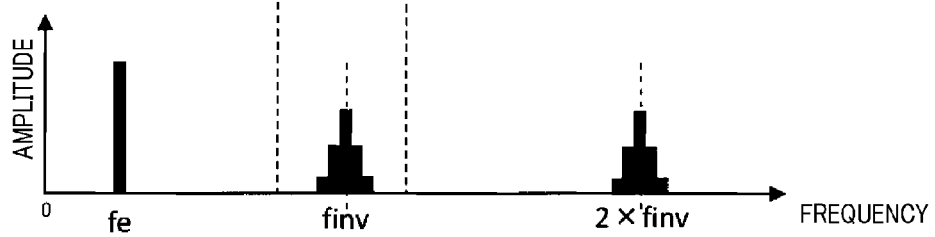

To solve such issues, the absolute value of the difference between the frequency fx of the DC bus harmonic component and the frequency fy of the switch harmonic component is set to be the predetermined value Δf or greater. As shown in FIG. 4A, the DC bus harmonic components are distributed mainly around the integral multiples of the converter carrier frequency fcnv. In addition, as shown in FIG. 4B, the switch harmonic components are distributed mainly around the integral multiples of the inverter carrier frequency finv. In FIG. 4B, the frequency of the fundamental component included in the switching pattern is fe.

According to the present embodiment, the predetermined value Δf is adapted in advance to a value at which the DC bus harmonic components do not cause fluctuations in the output power of the inverter 30. Specifically, for example, the predetermined value Δf may be adapted to a value at which the frequency bands of the DC bus harmonic components distributed mainly around the integral multiples of the converter carrier frequency fcnv and the frequency bands of the switch harmonic components distributed mainly around the integral multiples of the inverter carrier frequency finv do not overlap.

Figure 5:
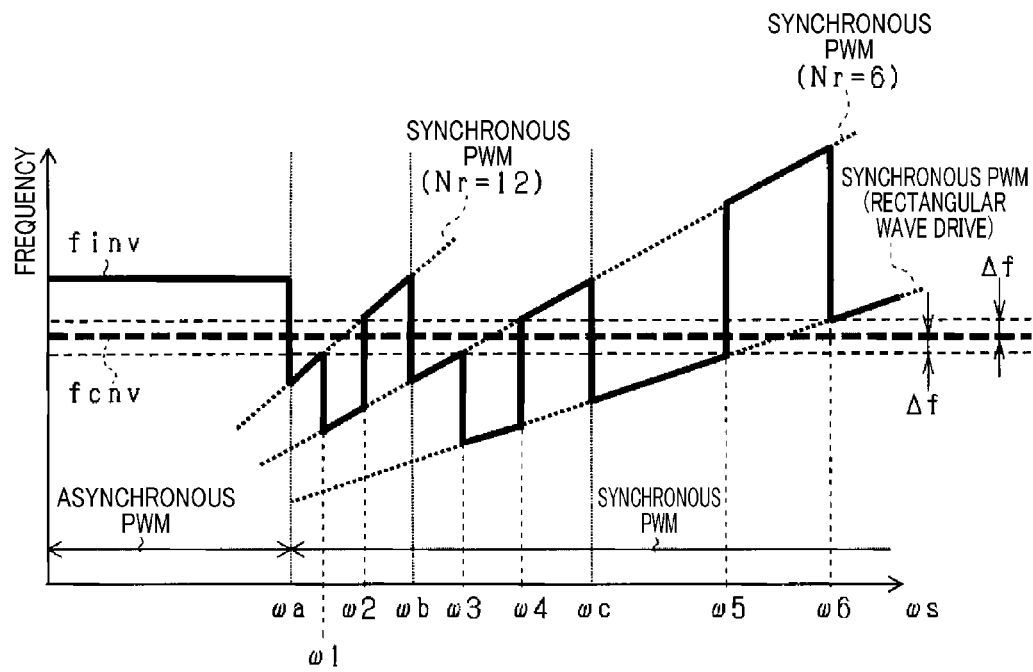
FIG. 5 is a diagram of a mode in which a carrier frequency of the inverter is changed.

The process for setting the inverter carrier frequency finv performed by the inverter carrier generating unit 51f will be described with reference to FIG. 5.

First, the case in which the asynchronous PWM process is performed will be described. When the electrical angular frequency ωs is determined to be equal to or lower than the first switchover angular frequency ωa, the inverter carrier generating unit 51f sets the inverter carrier frequency finv to a value that is equal to or greater than the value obtained by the converter carrier frequency fcnv and the predetermined value Δf being added. According to the present embodiment, the inverter carrier frequency finv is set to a value that is separated from the added value obtained by the converter carrier frequency fcnv and the predetermined value Δf being added. FIG. 5 shows an example in which the inverter carrier frequency finv is higher than the converter carrier frequency fcnv. However, the present disclosure is not limited thereto. The inverter carrier frequency finv may be lower than the converter carrier frequency fcnv.

Next, the case in which the synchronous PWM process is performed will be described. When the electrical angular frequency ωs is determined to be higher than the first switchover angular frequency ωa and equal to or lower than a first predetermined angular frequency ω1 (>ωa), the inverter carrier generating unit 51f sets the inverter carrier frequency finv such that the number of synchronizations Nr is 12. The number of synchronizations Nr is a value obtained by a single electrical angle cycle (360 degrees) of the motor generator 40 being divided by a single cycle (=1/finv) of the inverter carrier signal Sinv. The first predetermined angular frequency ω1 is an angular frequency at which the inverter carrier frequency finv at which the number of synchronizations Nr is 12 matches the value obtained by the predetermined value Δf being subtracted from the converter carrier frequency fcnv.

When the electrical angular frequency ωs is determined to be higher than the first predetermined angular frequency ω1 and less than a second predetermined angular frequency ω2, the inverter carrier generating unit 51f sets the inverter carrier frequency finv for performing a synchronous PWM process of which the number of synchronizations Nr is 6, instead of the synchronous PWM process of which the number of synchronizations Nr is 12. As a result, the converter carrier frequency fcnv and the inverter carrier frequency finv are prevented from becoming close. The second predetermined angular frequency ω2 is an angular frequency at which the inverter carrier frequency finv at which the number of synchronizations is 12 matches the value obtained by the converter carrier frequency fcnv and the predetermined value Δf being added.

According to the present embodiment, the reason for reducing the number of synchronizations Nr in the synchronous PWM process to prevent closeness between the carrier frequencies fcnv and finv is to prevent increase in switching loss. As a result, excessive temperature rise in the inverter 30 is prevented, and reduced reliability of the inverter 30 is prevented.

When the electrical angular frequency ωs is determined to be equal to or higher than the second predetermined angular frequency ω2 and equal to or lower than a second switchover angular frequency ωb (>ω2), the inverter carrier generating unit 51f sets the inverter carrier frequency finv such that the number of synchronizations Nr is 12. When the electrical angular frequency ωs is determined to be higher than the second switchover angular frequency ωb and equal to or lower than a third predetermined angular frequency ω3 (>ωb), the inverter carrier generating unit 51f sets the inverter carrier frequency finv such that the number of synchronizations Nr is 6. The third predetermined angular frequency ω3 is an angular frequency at which the inverter carrier frequency finv at which the number of synchronizations Nr is 6 matches the value obtained by the predetermined value Δf being subtracted from the converter carrier frequency fcnv.

When the electrical angular frequency ωs is determined to be higher than the third predetermined angular frequency ω3 and lower than a fourth predetermined angular frequency ω4, the inverter carrier generating unit 51f sets the inverter carrier frequency finv for performing a synchronous PWM process of which the number of synchronizations Nr is 1, instead of the synchronous PWM process of which the number of synchronizations Nr is 6. As a result, the converter carrier frequency fcnv and the inverter carrier frequency finv are prevented from becoming close. The fourth predetermined angular frequency ω4 is an angular frequency at which the inverter carrier frequency finv at which the number of synchronizations is 6 matches the value obtained by the converter carrier frequency fcnv and the predetermined value Δf being added. In addition, the reason for reducing the number of synchronizations Nr in the synchronous PWM process to prevent closeness between the carrier frequencies fcnv and finv is to prevent increase in switching loss.

When the electrical angular frequency ωs is determined to be equal to or higher than the fourth predetermined angular frequency ω4 and equal to or lower than a third switchover angular frequency ωc (>ω4), the inverter carrier generating unit 51f sets the inverter carrier frequency finv such that the number of synchronizations Nr is 6. When the electrical angular frequency ωs is determined to be higher than the third switchover angular frequency ωc and equal to or lower than a fifth predetermined angular frequency ω4 (>ωc), the inverter carrier generating unit 51f sets the inverter carrier frequency finv such that the number of synchronizations Nr is 1. That is, the inverter carrier generating unit 51f sets the inverter carrier frequency finv for performing rectangular wave control. The fifth predetermined angular frequency ω5 is an angular frequency at which the inverter carrier frequency finv at which the number of synchronizations Nr is 1 matches the value obtained by the predetermined value Δf being subtracted from the converter carrier frequency fcnv.

When the electrical angular frequency ωs is determined to be higher than the fifth predetermined angular frequency ω5 and less than a sixth predetermined angular frequency ω6, the inverter carrier generating unit 51f sets the inverter carrier frequency finv for performing a synchronous PWM process of which the number of synchronizations Nr is 6, instead of the synchronous PWM process of which the number of synchronizations Nr is 1. As a result, the converter carrier frequency fcnv and the inverter carrier frequency finv are prevented from becoming close. The sixth predetermined angular frequency ω6 is an angular frequency at which the inverter carrier frequency finv at which the number of synchronizations is 1 matches the value obtained by the converter carrier frequency fcnv and the predetermined value Δf being added.

The reason for increasing the number of synchronizations Nr in the synchronous PWM process to prevent closeness between the carrier frequencies fcnv and finv is that the number of synchronizations Nr cannot be further reduced.

When the electrical angular frequency ωs is determined to be equal to or higher than the sixth predetermined angular frequency ω6, the inverter carrier frequency generating unit 51f sets the inverter carrier frequency finv such that the number of synchronizations Nr is 1.

The inverter carrier frequency finv is stored in advance, in association with the electrical angular frequency ωs, in a memory serving as a storage unit provided in the motor control apparatus 50. The inverter carrier generating unit 51f sets the inverter carrier frequency finv based on the electrical angular frequency ωs and the information stored in the memory.

According to the present embodiment described above, the inverter carrier frequency finv is set such as to prevent closeness with the converter carrier frequency fcnv. As a result, interference between the fluctuations in the bus voltage accompanying driving of the DC-DC converter 20 and control of the inverter 30 can be prevented. Consequently, fluctuations in the output power of the inverter 30 can be suppressed, and torque fluctuations in the motor generator 40 can thereby be suppressed.

Second Embodiment

A second embodiment will be described below with reference to the drawings. Differences from the above-described first embodiment will mainly be described. According to the present embodiment, the converter carrier frequency fcnv is variably set instead of the inverter carrier frequency finv. As a result, closeness between the carrier frequencies finv and fcnv is prevented.

Figure 2:
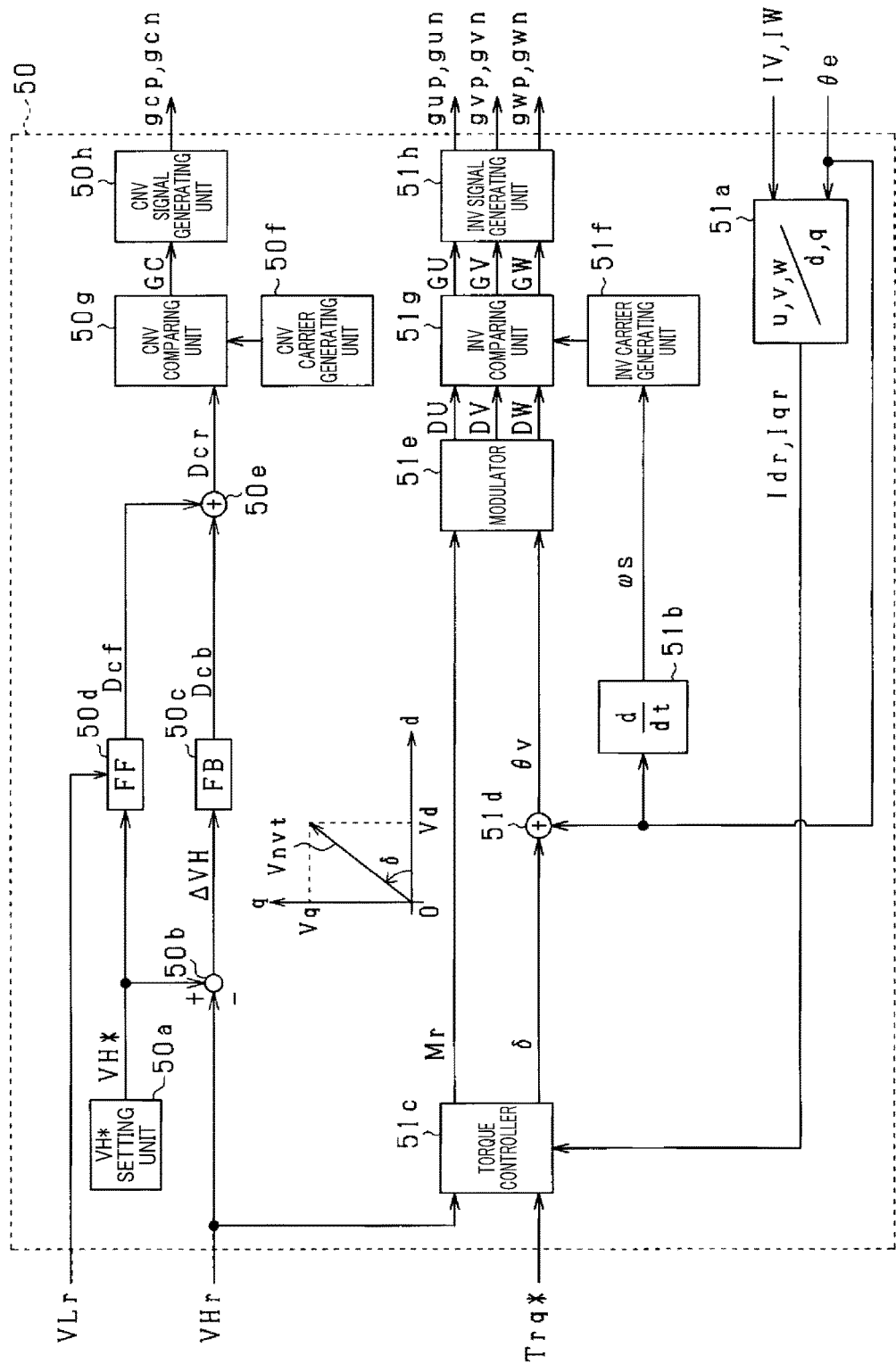
FIG. 2 is a block diagram of a motor control process.

According to the present embodiment, the electrical angular frequency ωs calculated by the speed calculating unit 51b is inputted to the converter carrier generating unit 50f shown in FIG. 2, described above. The converter carrier generating unit 50f variably sets the converter carrier frequency fcnv such that the absolute value of the difference between the inverter carrier frequency finv and the converter carrier frequency fcnv is equal to or greater than the predetermined value Δf.

Figure 6:
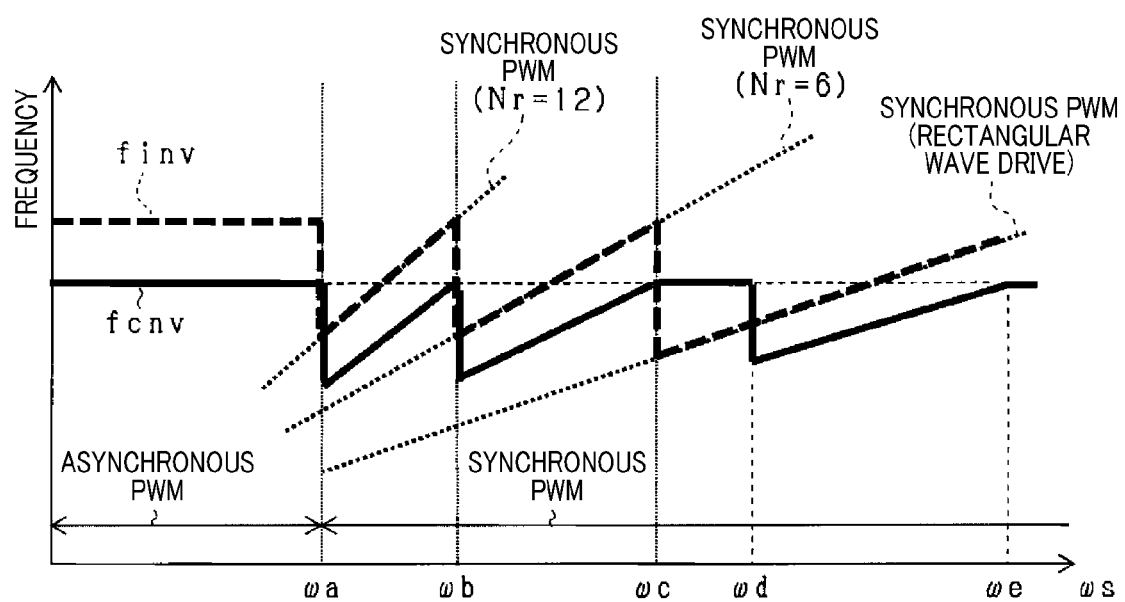
FIG. 6 is a diagram of a mode in which a carrier frequency of a converter is changed, according to a second embodiment.

According to the present embodiment, as shown in FIG. 6, when the electrical angular frequency ωs is determined to be higher than the first switchover angular frequency ωa and equal to or lower than the second switchover angular frequency ωb, the inverter carrier generator 51f sets the inverter carrier frequency finv such that the number of synchronizations is 12. When the electrical angular frequency ωs is determined to be higher than the second switchover angular frequency ωb and equal to or lower than the third switchover angular frequency ωc, the inverter carrier generator 51f sets the inverter carrier frequency finv such that the number of synchronizations is 6. When the electrical angular frequency ωs is determined to be higher than the third switchover angular frequency ωc, the inverter carrier generating unit 51f sets the inverter carrier frequency finv such that the number of synchronizations is 1.

Next, a process for setting the converter carrier frequency fcnv performed by the converter carrier generating unit 50f will be described with reference to FIG. 6.

When the electrical angular frequency ωs is determined to be equal to or lower than the first switchover angular frequency ωa, the converter carrier generating unit 50f sets the converter carrier frequency fcnv to a value that is separated from the inverter carrier frequency finv by the predetermined value Δf or more.

When the electrical angular frequency ωs is determined to be higher than the first switchover angular frequency ωa and equal to or lower than the second switchover angular frequency ωb, the converter carrier generating unit 50f sets the converter carrier frequency fcnv to be higher as the electrical angular frequency ωs becomes higher. At this time, the converter carrier frequency fcnv is set to be separated from the inverter carrier frequency finv by the predetermined value Δf or more. Here, the converter carrier frequency fcnv is set to be lower than the inverter carrier frequency finv to prevent increase in switching loss. As a result, excessive temperature rise in the DC-DC converter 20 is prevented, and reduced reliability of the DC-DC converter 20 is prevented.

When the electrical angular frequency ωs is determined to be higher than the second switchover angular frequency ωb and equal to or lower than the third switchover angular frequency ωc, the converter carrier generating unit 50f sets the converter carrier frequency fcnv to be higher as the electrical angular frequency ωs becomes higher. At this time, the converter carrier frequency fcnv is set to be separated from the inverter carrier frequency finv by the predetermined value Δf or more.

When the electrical angular frequency ωs is determined to be higher than the third switchover angular frequency ωc and equal to or lower than a fourth switchover angular frequency ωd (>ωc), the converter carrier generating unit 50f sets the converter carrier frequency fcnv to the fixed value that is set when the electrical angular frequency ωs is equal to or lower than the first switchover angular frequency ωa.

When the electrical angular frequency ωs is determined to be higher than the fourth switchover angular frequency ωd and equal to or lower than a fifth switchover angular frequency ωe (>ωd), the converter carrier generating unit 50f sets the converter carrier frequency fcnv to be higher as the electrical angular frequency ωs becomes higher. At this time, the converter carrier frequency fcnv is set to be lower than the inverter carrier frequency finv by the predetermined value Δf or more. When the electrical angular frequency ωs is determined to be higher than the fifth switchover angular frequency ωe, the converter carrier generating unit 50f sets the converter carrier frequency fcnv to the fixed value that is set when the electrical angular frequency ωs is equal to or lower than the first switchover angular frequency ωa.

The converter carrier frequency fcnv is stored in advance in the memory, in association with the electrical angular frequency ωs. The converter carrier generating unit 50f sets the converter carrier frequency fcnv based on the electrical angular frequency ωs and the information stored in the memory.

According to the present embodiment described above, as well, effects similar to those according to the above-described first embodiment can be achieved.

Third Embodiment

A third embodiment will be described below with reference to the drawings. Differences from the above-described first embodiment will mainly be described. According to the present embodiment, whether to shift the inverter carrier frequency finv to a high frequency side or a low frequency side is determined based on an inverter temperature Tinv detected by the inverter temperature detecting unit 72. According to the present embodiment, the inverter temperature Tinv is inputted to the inverter carrier generating unit 51f shown in FIG. 2, described above.

Figure 7:
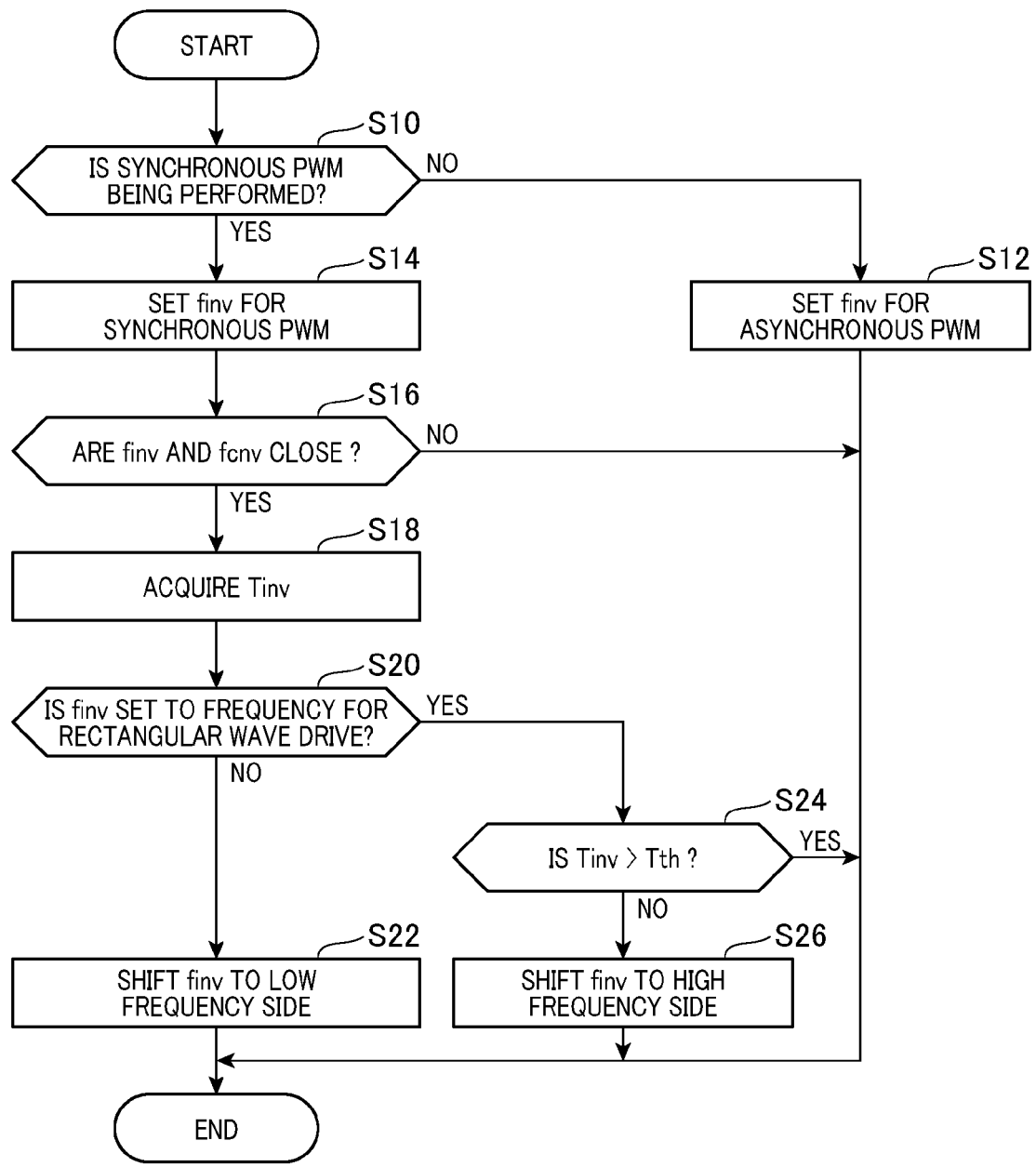
FIG. 7 is a flowchart of the steps in a process for changing the carrier frequency of an inverter, according to a third embodiment.

FIG. 7 shows the steps in a process for setting the inverter carrier frequency finv. For example, the process is repeatedly performed by the inverter carrier generating unit 51f at a predetermined cycle.

In this series of processes, first, at step S10, the inverter carrier generating unit 51f determines whether or not the synchronous PWM process is being performed based on the electrical angular frequency ωs. Here, the inverter carrier generating unit 51f determines that the synchronous PWM process is being performed when determined that the electrical angular frequency ωs is higher than the first switchover angular frequency ωa.

When determined NO at step S10, the inverter carrier generating unit 51f determines that the asynchronous PWM process is being performed and proceeds to step S12. At step S12, the inverter carrier generating unit 51f sets the inverter carrier frequency finv for the asynchronous PWM process in a manner similar to that according to the above-described first embodiment.

Meanwhile, when determined YES at step S10, the inverter carrier generating unit 51f proceeds to step S14 and sets the inverter carrier frequency finv for the synchronous PWM process based on the electrical angular frequency ωs. Specifically, the inverter carrier generating unit 51f selects the number of synchronizations Nr based on the electrical angular frequency ωs and sets the inverter carrier frequency finv corresponding to the selected number of synchronizations Nr.

At subsequent step S16, the inverter carrier generating unit 51f determines whether or not the converter carrier frequency fcnv and the inverter carrier frequency finv are close. According to the present embodiment, the inverter carrier generating unit 51f determines that the converter carrier frequency fcnv and the inverter carrier frequency finv are close when determined that the absolute value of the difference between the converter carrier frequency fcnv and the inverter carrier frequency finv is less than the predetermined value Δf. According to the present embodiment, the process at step S16 corresponds to a closeness determining unit.

When the inverter carrier generating unit 51f determines that the converter carrier frequency fcnv and the inverter carrier frequency finv are not close at step S16, the inverter carrier frequency finv set in the process at step S14 is used as is by the inverter comparing unit 51g. Meanwhile, when determined that the converter carrier frequency fcnv and the inverter carrier frequency finv are close at step S16, the inverter carrier generating unit 51f proceeds to step S18 and acquires the inverter temperature Tinv. According to the present embodiment, the process at step S18 corresponds to a temperature acquiring unit. At subsequent step S20, the inverter carrier generating unit 51f determines whether or not the inverter carrier frequency finv is set to the frequency for rectangular wave drive in which the number of synchronizations Nr is 1.

Figure 8:
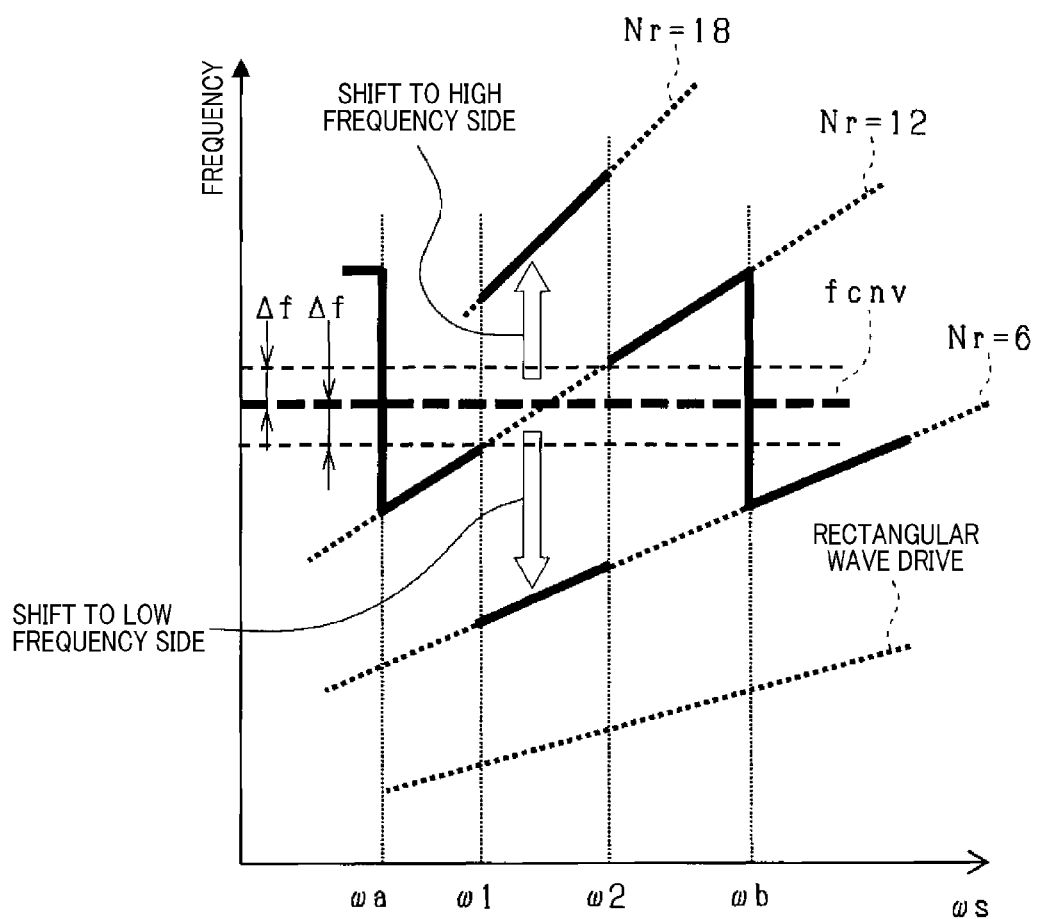
FIG. 8 is a diagram of a mode in which a carrier frequency is changed based on an inverter temperature.

When determined NO at step S20, the inverter carrier generating unit 51f proceeds to step S22 and shifts the inverter carrier frequency finv set in the process at step S14 towards the low frequency side. As a result, the inverter carrier frequency finv is set to a value that is equal to or less than the value obtained by the predetermined value Δf being subtracted from the converter carrier frequency fcnv. Here, FIG. 8 shows an example of a mode for setting the inverter carrier frequency finv in a case in which the number of synchronizations Nr is changed from 12 to 6 when the current electrical angular frequency ωs is higher than the first predetermined angular frequency ω1 and equal to or lower than the second predetermined angular frequency ω2.

Returning to the description of FIG. 7 given above, when determined YES at step S20, the inverter carrier generating unit 51f proceeds to step S24 and determines whether or not the acquired inverter temperature Tinv exceeds a threshold temperature Tth thereof. When the inverter carrier generating unit 51f determines YES at step S24, increase in the inverter carrier frequency finv is prohibited. The inverter carrier frequency finv set in the process at step S14 is used as is by the inverter comparing unit 51g.

Meanwhile, when determined that the inverter temperature Tinv is equal to or lower than the threshold temperature Tth at step S24, the inverter carrier generating unit 51f proceeds to step S26 and shifts the frequency finv of the inverter carrier signal Sinv set in the process at step S24 towards the high frequency side. As a result, the inverter carrier frequency finv is set to a value that is equal to or greater than the value obtained by the converter carrier frequency fcnv and the predetermined value Δf being added. Here, FIG. 8 shows an example of a mode for setting the inverter carrier frequency finv in a case in which the number of synchronizations Nr is changed from 12 to 18.

According to the present embodiment described above, when the inverter temperature Tinv is determined to exceed the threshold temperature Tth, shifting of the inverter carrier frequency finv towards the high frequency side is prohibited. As a result, the inverter 30 can be protected from overheating.

Fourth Embodiment

A fourth embodiment will be described below with reference to the drawings. Differences from the above-described first embodiment will mainly be described. According to the present embodiment, the modulation method in the inverter comparing unit 51g is changed to prevent closeness between the frequency of the DC bus harmonic component and the frequency of the switch harmonic component.

According to the present embodiment, the converter carrier frequency fcnv from the converter carrier generating unit 50f and the inverter carrier frequency finv from the inverter carrier generating unit 51f are inputted to the inverter comparing unit 51g. According to the present embodiment, the method by which the inverter carrier generating unit 51f sets the inverter carrier frequency finv is the same as the method described according to the above-described second embodiment.

Figure 9:
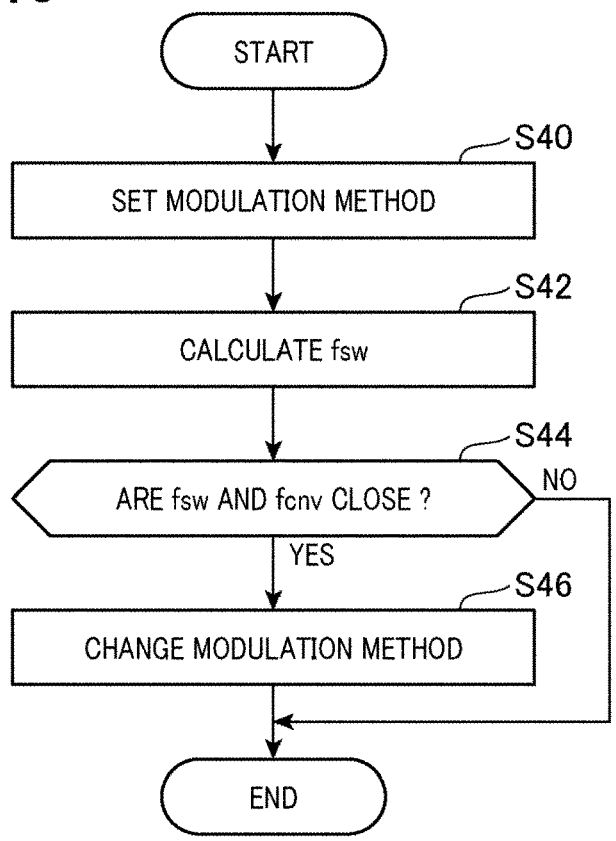
FIG. 9 is a flowchart of the steps in a process for changing a modulation method, according to a fourth embodiment.

FIG. 9 shows the steps in a process for changing the modulation method. For example, the process is repeatedly performed by the inverter comparing unit 51g at a predetermined cycle.

In this series of processes, first, at step S40, the inverter comparing unit 51g sets the modulation method. Then, the inverter comparing unit 51g generates the U-phase PWM signal GU, the V-phase PWM signal GV, and the W-phase PWM signal GW, based on the U-phase command value DU, the V-phase command value DV, and the W-phase command value DW calculated by the modulator 51e and the modulation method that has been set. According to the present embodiment, either of a three-phase modulation method and a two-phase modulation method is set. The two-phase modulation method is used for the purpose of reducing the number of times switching is performed, thereby reducing loss in the inverter 30. In two-phase modulation, while the operating states of the upper and lower arm switches are fixed for a predetermined period one phase at a time in succession, the upper and lower arm switches configuring the two phases other than the fixed phase are alternately turned on. Specifically, for example, an operation in which the upper arm switch is fixed to the ON state and an operation in which the lower arm switch is fixed to the ON state are successively performed every 60 degrees electrical angle.

At subsequent step S42, the inverter comparing unit 51g calculates a frequency fsw of a switch harmonic component included in the U-phase PWM signal GU, the V-phase PWM signal GV, and the W-phase PWM signal GW generated in the process at step S40. For example, the frequency fsw of the switch harmonic component may be calculated by a Fourier transform being performed on the PWM signal. According to the present embodiment, the process at step S42 corresponds to a switch harmonic acquiring unit.

At subsequent step S44, the inverter comparing unit 51g determines whether or not the frequency fsw of the switch harmonic component calculated in the process at step S42 and the converter carrier frequency fcnv are close. According to the present embodiment, the inverter comparing unit 51g determines that the frequency fsw of the switch harmonic component and the converter carrier frequency fcnv are close when determined that the absolute value of the difference between the converter carrier frequency fcnv and the frequency fsw of the switch harmonic component is less than the predetermined value Δf.

When the inverter comparing unit 51g determines that the frequency fsw of the switch harmonic component and the converter carrier frequency fcnv are not close at step S44, the U-phase PWM signal GU, the V-phase PWM signal GV, and the W-phase PWM signal GW calculated in the process at step S40 are used as is by the inverter signal generating unit 51h.

Meanwhile, when determined that the frequency fsw of the switch harmonic component and the converter carrier frequency fcnv are close at step S44, the inverter comparing unit 51g proceeds to step S46 and changes the modulation method set in the process at step S40. Specifically, for example, when the three-phase modulation method is set in the process at step S40, the modulation method is changed to the two-phase modulation method. Then, the inverter comparing unit 51g generates the U-phase PWM signal GU, the V-phase PWM signal GV, and the W-phase PWM signal GW again based on the modulation method after the change, and the U-phase command value DU, the V-phase command value DV, and the W-phase command value DW calculated by the modulator 51e. As a result, the U-phase PWM signal GU, the V-phase PWM signal GV, and the W-phase PWM signal GW that have been generated again are used by the inverter signal generating unit 51h. Consequently, the absolute value of the difference between the frequency of the switch harmonic component and the converter carrier frequency fcnv is equal to or greater than the predetermined value Δf.

According to the present embodiment described above, as well, effects similar to those according to the above-described first embodiment can be achieved.

Fifth Embodiment

A fifth embodiment will be described below with reference to the drawings. Differences from the above-described first embodiment will mainly be described. According to the present embodiment, the command modulation factor Mr is changed as a result of the command output voltage VH* of the DC-DC converter 20 being changed, and an amplitude of a switch harmonic component is thereby reduced. As a result, the amplitude of a fluctuation component of which the fluctuation frequency is the difference between the frequency of a switch harmonic component and the frequency of a DC bus harmonic component is reduced. Consequently, the effects of interference are suppressed even when the frequency of the switch harmonic component and the frequency of the DC bus harmonic component are close.

According to the present embodiment, the converter carrier frequency fcnv from the converter carrier generating unit 50f and the inverter carrier frequency finv from the inverter carrier generating unit 51f are inputted to the command voltage setting unit 50a. According to the present embodiment, the method by which the inverter carrier generating unit 51f sets the inverter carrier frequency finv is the same as the method described according to the above-described second embodiment.

Figure 10:
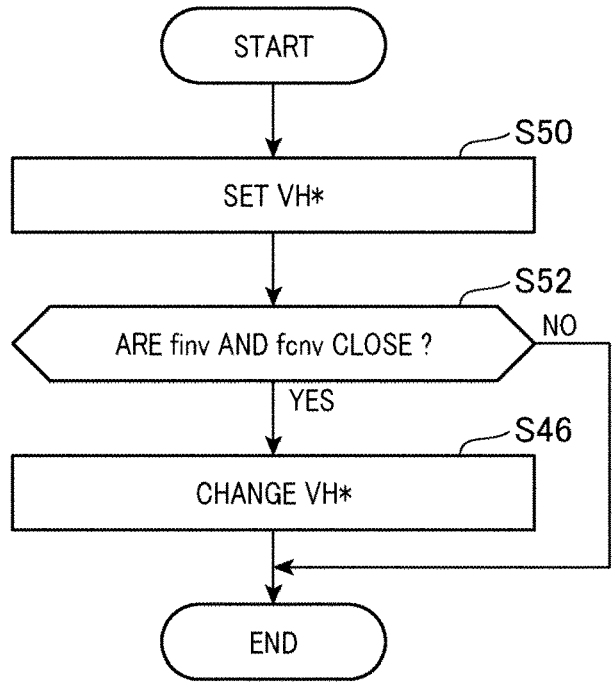
FIG. 10 is a flowchart of the steps in a process for changing an output voltage of a DC-DC converter, according to a fifth embodiment.

FIG. 10 shows the steps in a process for changing the command output voltage VH*. For example, the process is repeatedly performed by the command voltage setting unit 50a at a predetermined cycle.

In this series of processes, first, at step S50, the command voltage setting unit 50a sets the command output voltage VH*. At subsequent step S52, the command voltage setting unit 50a determines whether or not the converter carrier frequency fcnv and the inverter carrier frequency finv are close. This determination may be performed by the same method as that in the process at step S16 in FIG. 7.

When the command voltage setting unit 50a determines that the converter carrier frequency fcnv and the inverter carrier frequency finv are not close at step S52, the command output voltage VH* set in the process at step S50 is used as is by the voltage deviation calculating unit 50b and the FF calculating unit 50d.

Meanwhile, when determined that the converter carrier frequency fcnv and the inverter carrier frequency finv are close at step S52, the command voltage setting unit 50a proceeds to step S54 and changes the command output voltage VH* set in the process at step S50 towards the decreasing side or the increasing side. Therefore, the command output voltage VH* after the change is used by the voltage deviation calculating unit 50b and the FF calculating unit 50d.

As a result, the output voltage VHr of the DC-DC converter 20 changes, and the command modulation factor Mr and the voltage potential δ change. Consequently, the operation point of the inverter changes, such as through changes in the actual modulation factor and the power factor of the inverter 30. The spectrum of the switch harmonics changes. As a result, at least one of the amplitude of the switch harmonic component close to the frequency of the DC bus harmonic component being equal to or less than a predetermined amplitude, and the absolute value of the difference between the frequency of the DC bus harmonic component and the frequency of the switch harmonic component being equal to or greater than the predetermined value Δf can be actualized. Therefore, interference between the fluctuations in the bus voltage accompanying driving of the DC-DC converter 20 and control of the inverter 30 can be prevented.

Sixth Embodiment

A sixth embodiment will be described below with reference to the drawings. Differences from the above-described first embodiment will mainly be described. According to the present embodiment, the U-phase PWM signal GU, the V-phase PWM signal GV, and the W-phase PWM signal GW are generated using a pulse pattern instead of the PWM process using carrier signals.

Figure 11:
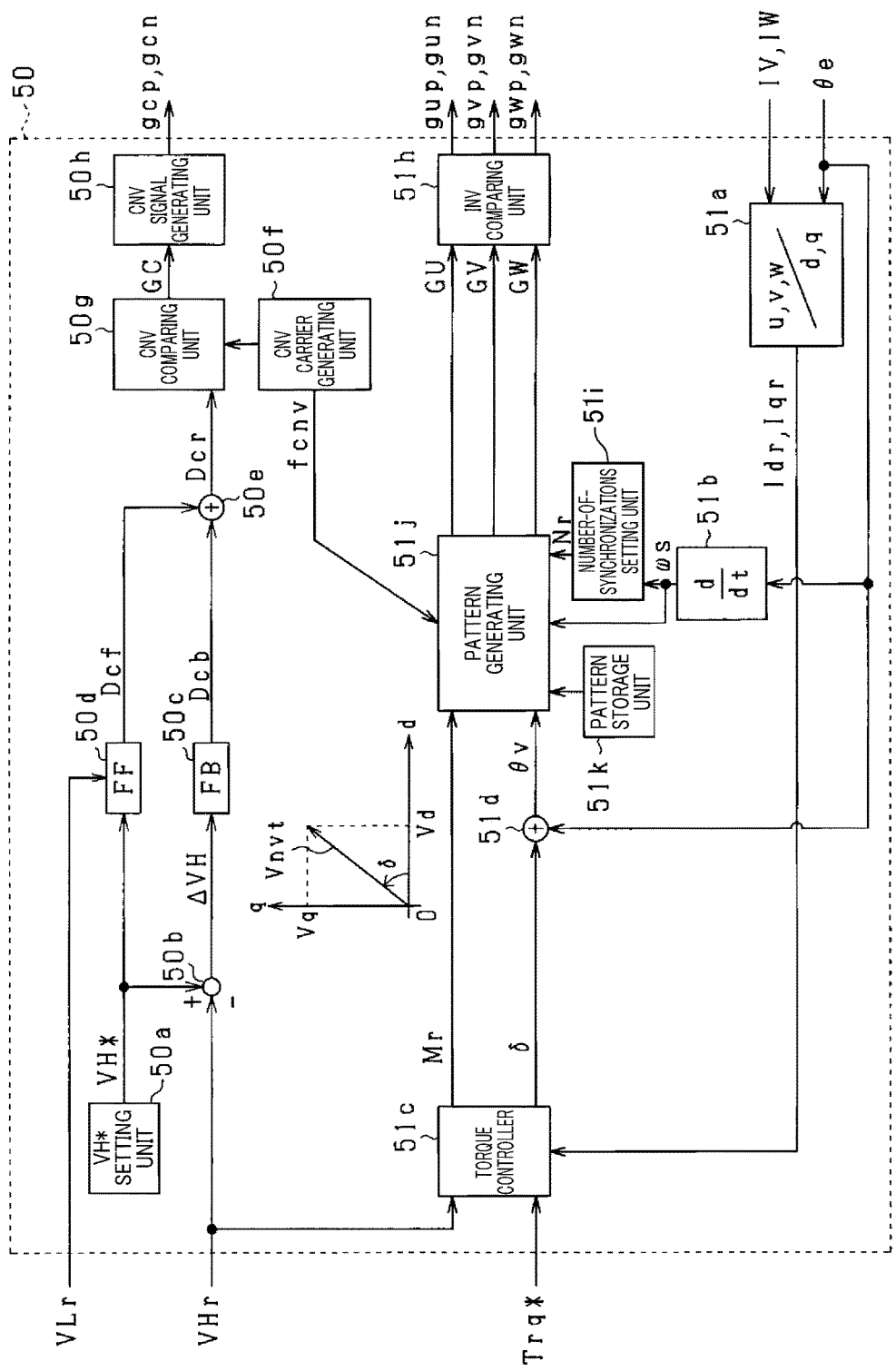
FIG. 11 is a block diagram of a motor control process according to a sixth embodiment.

FIG. 11 shows a block diagram of a torque control process according to the present embodiment. Configurations in FIG. 11 that are identical to the configurations shown in FIG. 2 described above are given the same reference numbers for convenience.

A number-of-synchronizations setting unit 51i sets the number of synchronizations Nr based on the electrical angular frequency ωs and a number-of-synchronizations table. The reason for performing this setting process is that the pulse pattern is generated based on the concept behind the synchronous PWM process. The number-of-synchronizations table is information in which each of a plurality of electrical angular frequency regions and a number of synchronizations Nr are associated in advance. According to the present embodiment, multiples of 3, that is, 3, 6, 9, 12, 15 . . . are used as the numbers of synchronizations Nr associated with the electrical angular frequency regions. According to the present embodiment, multiples of 6 are used as the number of synchronizations Nr. In addition, upper limit thresholds ωu3, ωu6, ωu9, ωu12, ωu15 . . . of the electrical angular frequency regions associated with the numbers of synchronizations 3, 6, 9, 12, 15, . . . are each set to ωu (Nr)=ωcmax/Nr. Here, ωcmax indicates an upper angular frequency of the carrier signal.

A pattern generating unit 51j generates a command pattern based on the electrical angular frequency ωs, the number of synchronizations Nr, the command modulation factor Mr, and the actual phase θv. The command pattern is a command value of the switching pattern. For example, the command pattern is generated over 0 to 360 degrees. The command pattern is generated based on pulse patterns stored in a pattern storage unit 51k. The pulse patterns are stored in the pattern storage unit 51k in advance, in association with the number of synchronizations Nr, the command modulation factor Mr, and the modulation method. The pattern storage unit 51k is configured in the memory.

Figure 12:
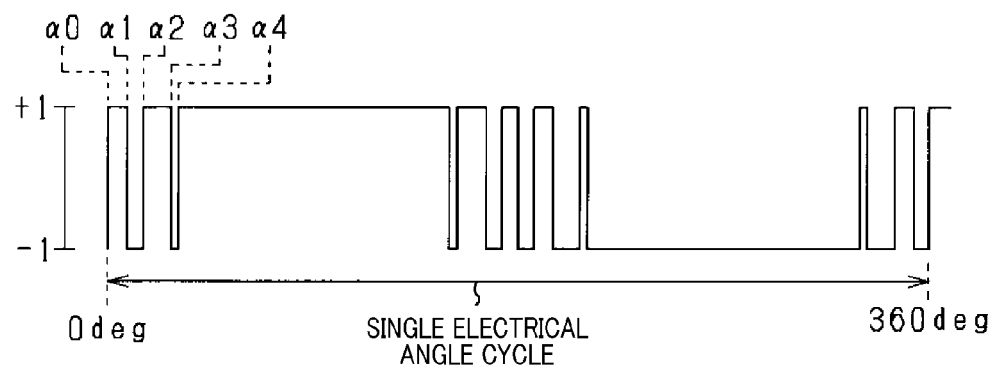
FIG. 12 is a diagram of an example of a pulse pattern.

FIG. 12 shows an example of a pulse pattern. As shown in FIG. 12, the pulse pattern is map information in which the on-instruction signal and the off-instruction signal are each associated with the electrical angle θe. According to the present embodiment, the pattern storage unit 51k stores therein electrical angles indicating switchover from either of the on-instruction signal and the off-instruction signal to the other, as the pulse pattern. FIG. 12 shows an example in which α0, α1, α2, and the like are given as switching timings that are electrical angles indicating switchover from either of the on-instruction signal and the off-instruction signal to the other. The pulse pattern may be associated with voltage amplitude instead of the command modulation factor Mr.

A pattern generating unit 51j selects a switching timing a that corresponds to the actual phase θv, among the switching timings α prescribing the generated command pattern. The pattern generating unit 51j then generates the U-phase PWM signal GU, the V-phase PWM signal GV, and the W-phase PWM signal GW based on the selected switching timing a and outputs the generated U-phase PWM signal GU, the V-phase PWM signal GV, and the W-phase PWM signal GW to the inverter signal generating unit 51h.

Figure 13A:
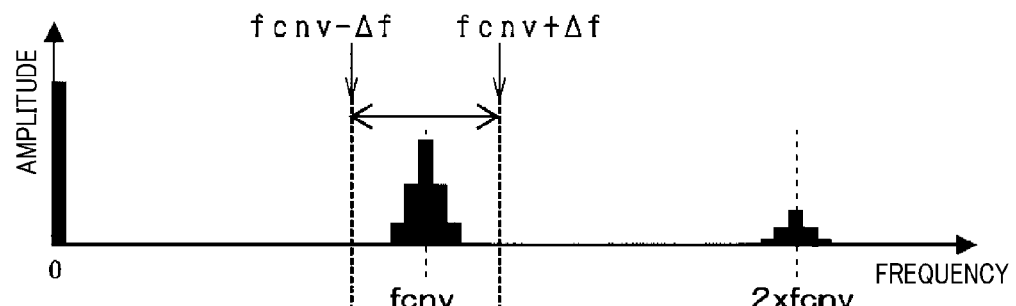
FIGS. 13A and 13B are diagrams of a spectrum of bus harmonic components and spectrum of switch harmonic components of an inverter.
Figure 13B:
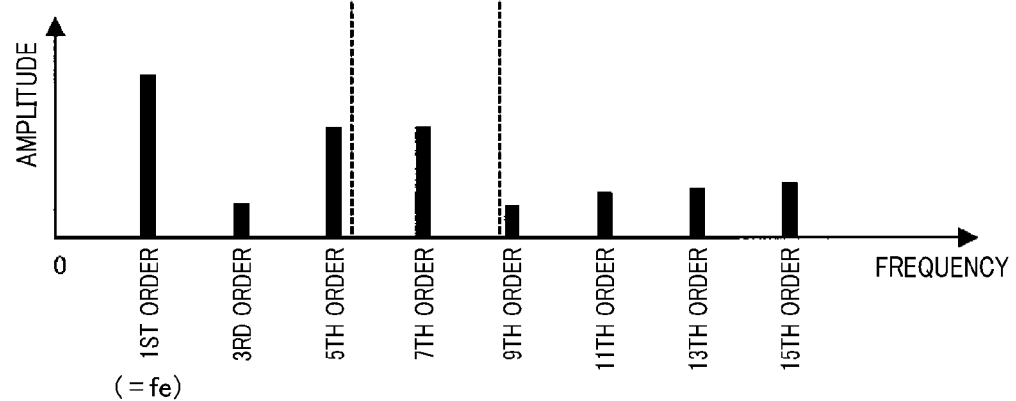

Here, the switch harmonic components that are the harmonic components included in the command pattern are distributed at the integral multiples of the fundamental component included in the command pattern. In particular, as shown in FIG. 12, in the case of a pattern in which a second pulse pattern is connected to a first pulse pattern that is from 0 to 180 degrees, the second pattern being linearly symmetrical to the first pulse pattern in relation to an axis line indicated at 180 degrees, the switch harmonic components are distributed at odd-numbered multiples of the fundamental component as shown in FIG. 13B. When the converter carrier frequency fcnv and a frequency fpt of the switch harmonic component are close and the amplitude of the switch harmonic component is greater than the predetermined amplitude, a low-frequency harmonic component of which the fluctuation frequency is the difference between the frequency of the DC bus harmonic component and the frequency fpt of the switch harmonic component is generated. As a result, torque fluctuations in the motor generator 40 increase.

To solve this issue, the pattern generating unit 51*j* sets the command pattern such that the absolute value of the difference between the converter carrier frequency fcnv and the frequency fpt of a switch harmonic component included in the command pattern is equal to or less than the predetermined value Δf.

Figure 14:
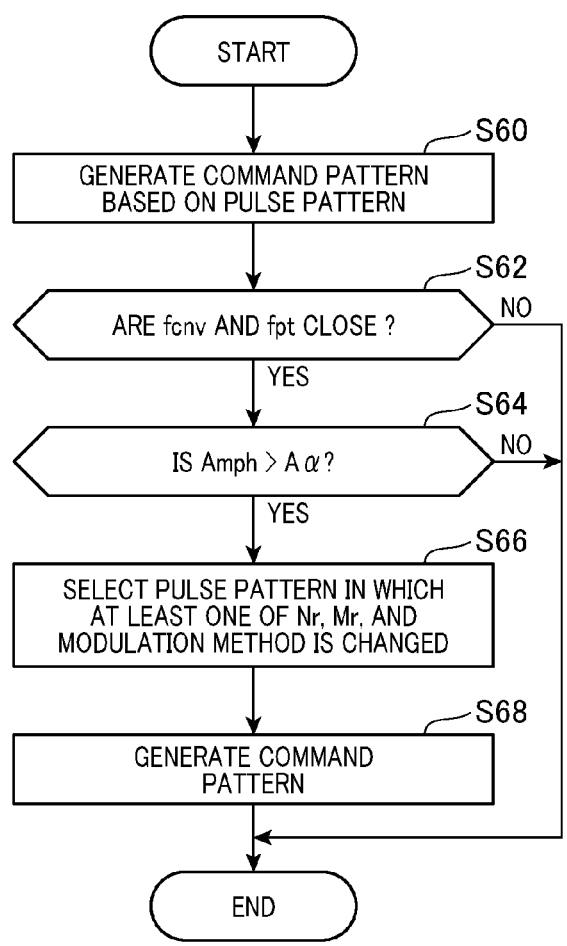
FIG. 14 is a flowchart of the steps in a process for changing a pulse pattern.

FIG. 14 shows the steps in a process for setting the command pattern. For example, the process is repeatedly performed by the pattern generating unit 51*j* at a predetermined cycle.

In this series of processes, first, at step S60, the pattern generating unit 51*j* generates the command pattern based on the electrical angular frequency ωs, the number of synchronizations Nr, the command modulation factor Mr, and the actual phase θv.

At subsequent step S62, the pattern generating unit 51*j* determines whether or not the frequency fpt of each switch harmonic component included in the command pattern and the converter carrier frequency fcnv are close. According to the present embodiment, the pattern generating unit 51*j* determines that the frequency fpt of a switch harmonic component included in the command pattern and the converter carrier frequency fcnv are close when determined that the absolute value of the difference between the frequency fpt of the switch harmonic component and the converter carrier frequency fcnv is less than the predetermined value Δf. Here, for example, the frequency fpt of the switch harmonic component used in the determination may be calculated in the following manner. Specifically, first, the spectrum of the switch harmonic components is estimated by performing a Fourier transform, such as a fast Fourier transform (FFT), on the command pattern generated in the process at step S60. Alternatively, the spectrum of the switch harmonic components is estimated based on pattern design information such as the modulation factor and the modulation method of the command pattern generated in the process at step S60. Then, the frequency fpt of the switch harmonic component is calculated based on the estimated spectrum.

When the pattern generating unit 51*j* determines that the frequency fpt of each switch harmonic component included in the command pattern and the converter carrier frequency fcnv are not close, the U-phase PWM signal GU, the V-phase PWM signal GV, and the W-phase PWM signal GW, are generated using the command pattern generated in the process at step S60 as is. Meanwhile, when determined that the frequency fpt of a switch harmonic component included in the command pattern and the converter carrier frequency fcnv are close at step S62, the pattern generating unit 51*j* proceeds to step S64 and determines whether or not an amplitude Amph of the switch harmonic component determined to be close to the converter carrier frequency fcnv in the process at step S62, among the plurality of switch harmonic components included in the command pattern, is greater than a predetermined amplitude Aα. Here, the amplitude Amph may be calculated based on the spectrum estimated in the process at step S62. The predetermined amplitude Aα is set as a threshold prescribed based on a correlation between a torque fluctuation amount of the motor generator 40 and the switch harmonic component.

When the pattern generating unit 51*j* determines NO at step S64, the U-phase PWM signal GU, the V-phase PWM signal GV, and the W-phase PWM signal GW, are generated using the command pattern generated in the process at step S60 as is. A reason for this is that, when the amplitude Amph of a switch harmonic component that fluctuates at a frequency close to the converter carrier frequency fcnv is small, the effect on interference is small.

Meanwhile, when determined YES at step S64, the pattern generating unit 51*j* proceeds to step S66 and selects, from the pattern storage unit 51*k*, a pulse pattern in which at least one of the number of synchronizations Nr, the command modulation factor 51*k*, and the modulation method used in the process at step S60 is changed. Then, at step S68, the pattern generating unit 51*j* generates the command pattern again based on the selected pulse pattern.

As a result of at least one of the number of synchronizations Nr and the modulation method being changed, the absolute value of the difference between the frequency fpt of the switch harmonic component of which the amplitude is greater than the predetermined amplitude, among the switch harmonic components included in the command pattern that has been generated again, and the converter carrier frequency fcnv is equal to or greater than the predetermined value Δf.

Meanwhile, as a result of the command modulation factor Mr being changed, the amplitude of the switch harmonic component of which the frequency is close to the converter carrier frequency fcnv, among the switch harmonic components included in the command pattern than has been generated again, is equal to or less than the predetermined amplitude Aα.

Figure 15:
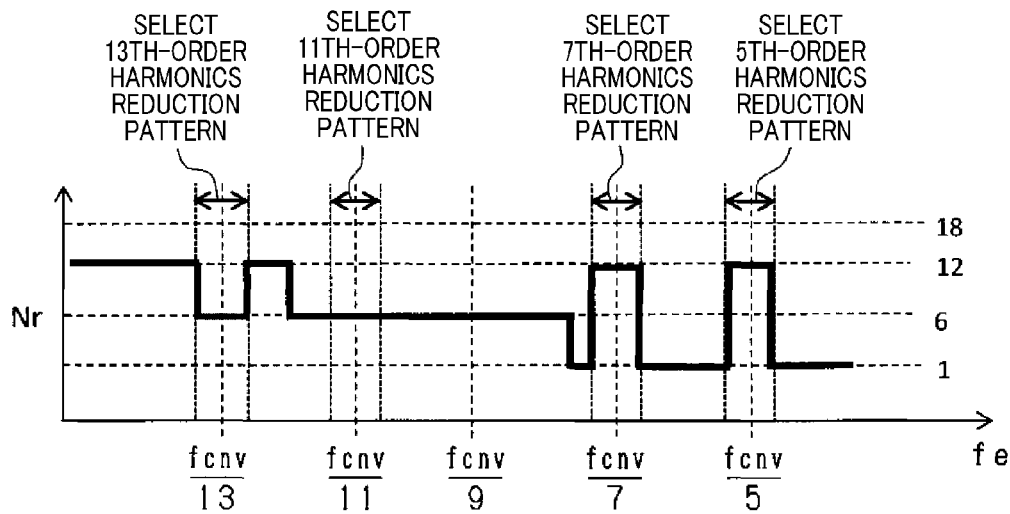
FIG. 15 is a diagram of a mode in which the pulse pattern is changed.
Figure 16:
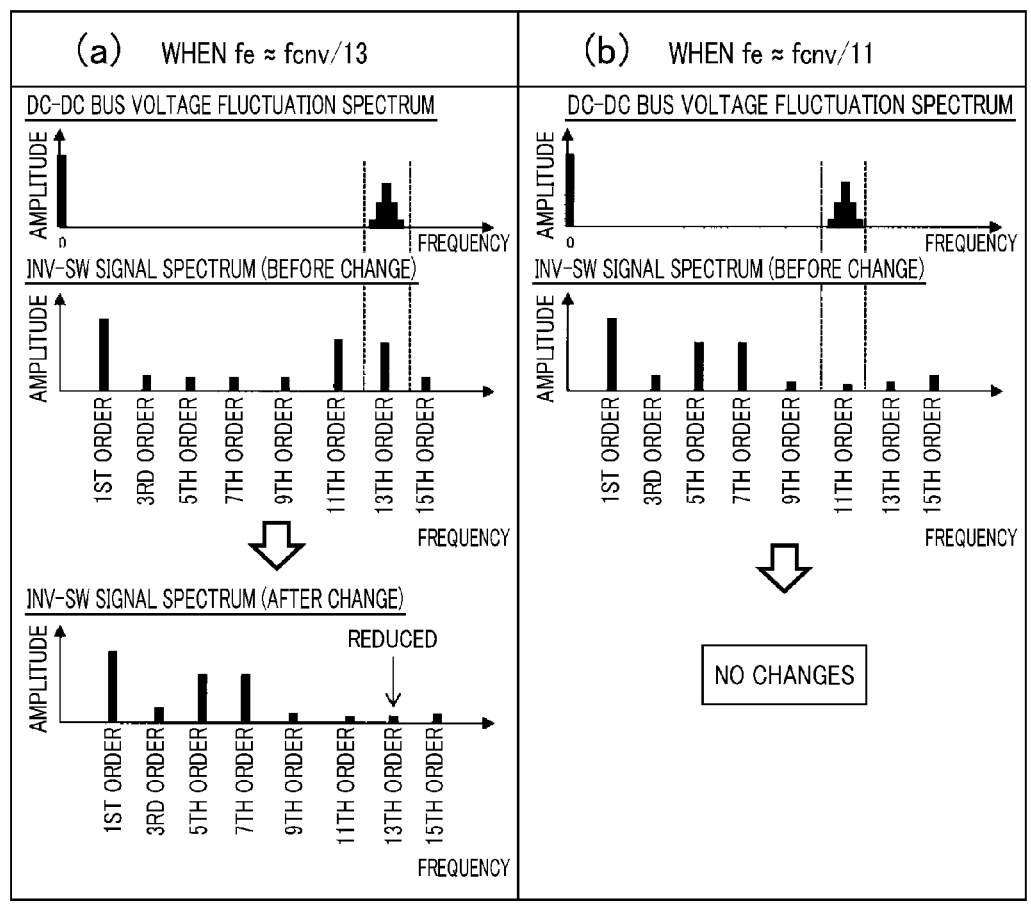
FIG. 16 illustrate, by (a) and (b), a diagram of a spectrum of bus harmonic components and spectrum of switch harmonic components of an inverter.

FIGS. 15 and 16 show specific examples in which the number of synchronizations Nr used to select the pulse pattern is changed. A lateral axis in FIG. 15 indicates the frequency fe of the fundamental component included in the output voltage of the inverter 30.

As shown in FIG. 15, when determined that the converter carrier frequency fcnv and a frequency of a 13th-order switch harmonic component, which is expressed by fcnv/13, are close, the pattern generating unit 51*j* selects a pulse pattern in which the number of synchronization Nr is 6 instead of the pulse pattern in which the number of synchronization Nr is 12. As a result, as shown in FIG. 16 by (a), the amplitude Amph of the 13th-order switch harmonic component included in the command pattern is equal to or less than the predetermined amplitude Aα. Here, the reason for reducing the amplitude by reducing the number of synchronizations Nr is to reduce switching loss and protect the inverter 30 from overheating.

Returning to the description of FIG. 15 given above, when determined that the frequency of an 11th-order switch harmonic component and the converter carrier frequency fcnv are close, the pattern generating unit 51*j* does not perform selection of a pulse pattern in which the number of synchronizations Nr is changed. A reason for this is that, as shown in FIG. 16 by (b), the amplitude Amph of the 11th-order switch harmonic component is equal to or less than the predetermined amplitude Aα even without the number of synchronizations Nr being changed.

Returning to the description of FIG. 15 given above, when determined that the frequencies of 7th-order and 5th-order switch harmonic components and the converter carrier frequency fcnv are close, the pattern generating unit 51*j* selects the pulse pattern of which the number of synchronizations Nr is 12, instead of the pulse pattern of which the number of synchronizations Nr is 1. As a result, the amplitudes Amph of the 7th-order and 5th-order switch harmonic components included in the command pattern are equal to or less than the predetermined amplitude Aα.

As described above, effects similar to those according to the above-described first embodiment can also be achieved in a configuration in which the pulse pattern is used.

Seventh Embodiment

A seventh embodiment will be described below with reference to the drawings. Differences from the above-described sixth embodiment will mainly be described. According to the present embodiment, the number of synchronizations Nr when the pulse pattern is change is determined based on the inverter temperature Tinv detected by the inverter temperature detecting unit 72. According to the present embodiment, the inverter temperature Tinv is inputted to the pattern generating unit 51j in FIG. 11, described above.

Figure 17:
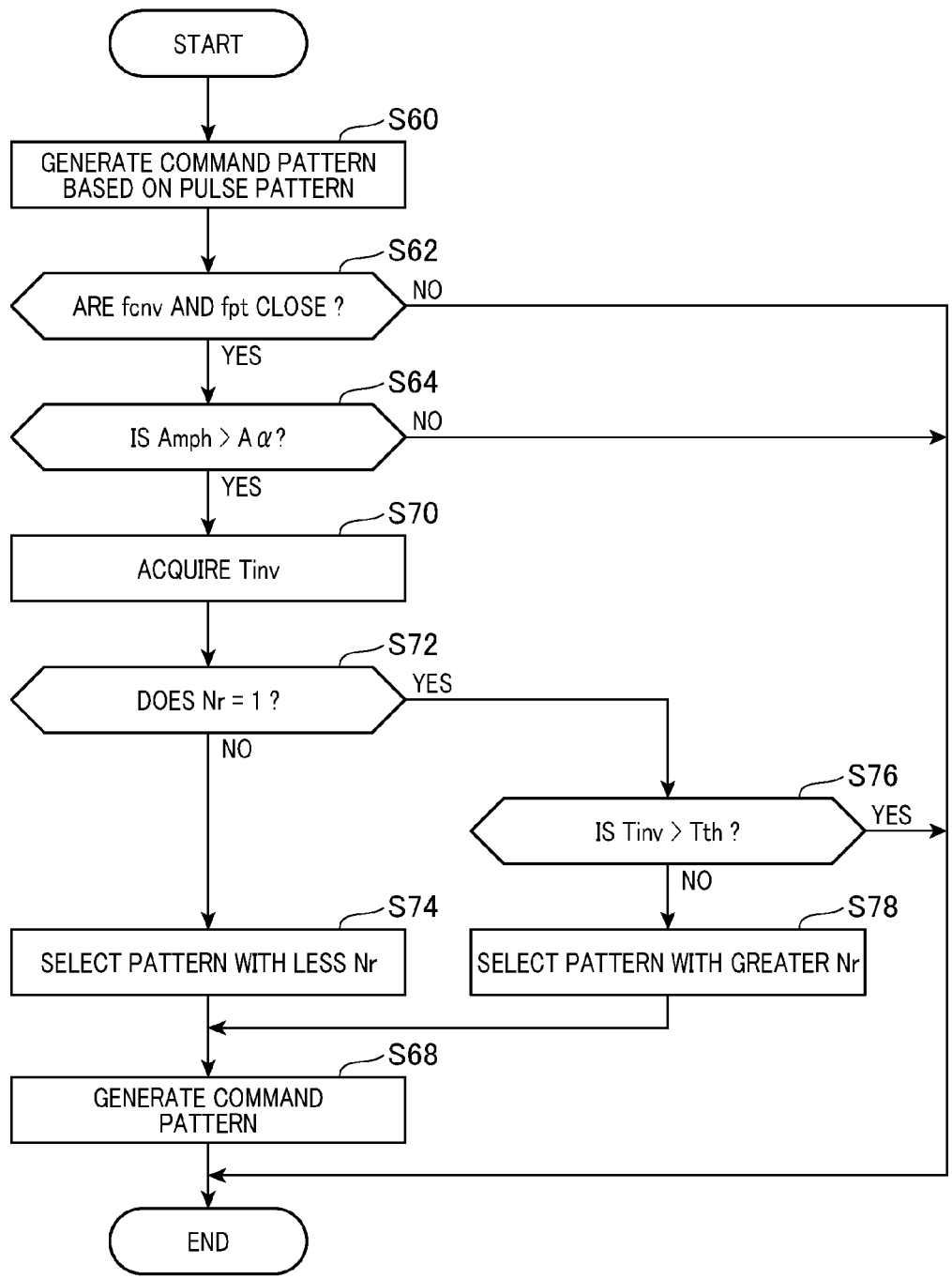
FIG. 17 is a flowchart of the steps in a process for changing a pulse pattern, according to a seventh embodiment.

FIG. 17 shows the steps in a process for setting a command pattern. For example, the process is repeatedly performed by the pattern generating unit 51j at a predetermined cycle. Processes in FIG. 17 that are identical to the processes in FIG. 14 described above are given the same reference numbers for convenience.

In this series of processes, when determined YES at step S64, the pattern generating unit 51j proceeds to step S70 and acquires the inverter temperature Tinv. At subsequent step S72, the pattern generating unit 51j determines whether or not the number of synchronizations Nr acquired in the process at step S60 is 1.

When determined NO at step S72, the pattern generating unit 51j proceeds to step S74 and selects the pulse pattern corresponding to a number of synchronizations Nr that is less than the number of synchronizations Nr acquired in the process at step S60.

Meanwhile, when determined YES at step S72, the pattern generating unit 51j proceeds to step S76 and determines whether or not the acquired inverter temperature Tinv exceeds the threshold temperature Tth. When the pattern generating unit 51j determines YES at step S76, increase in the number of synchronizations Nr is prohibited. The command pattern generated in the process at step S60 is used as is.

Meanwhile, when determined that the inverter temperature Tinv is equal to or lower than the threshold temperature Tth at step S76, the pattern generating unit 51j proceeds to step S78 and selects the pulse pattern corresponding to a number of synchronizations Nr that is greater than the number of synchronizations Nr acquired in the process at step S60. Upon completing the process at step S74 or S78, the pattern generating unit 51j proceeds to step S68.

According to the present embodiment described above, closeness between the converter carrier frequency fcnv and the frequency of the switch harmonic component can be prevented while protecting the inverter 30 from overheating.

Eighth Embodiment

Figure 18:
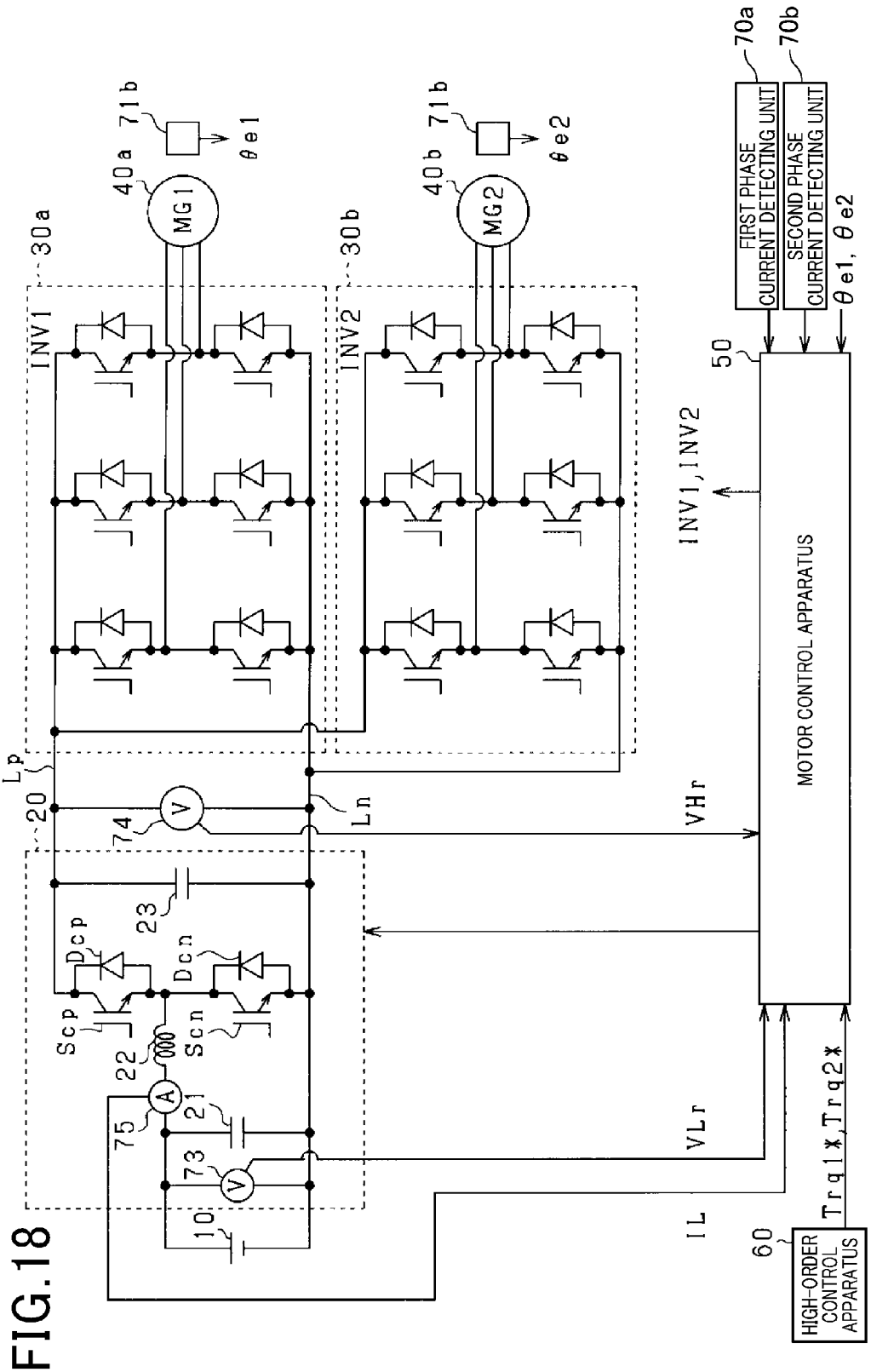
FIG. 18 is an overall configuration diagram of a motor control system according to an eighth embodiment.

An eighth embodiment will be described below with reference to the drawings. Differences from the above-described first embodiment will mainly be described. According to the present embodiment, as shown in FIG. 18, a control system that includes two sets of motor generators and inverters is used as the control system. Configurations in FIG. 18 that are identical to the configurations in FIG. 1 described above are given the same reference numbers for convenience.

As shown in FIG. 18, the control system includes a first inverter 30a, a first motor generator 40a, a second inverter 30b, a second motor generator 40b, and an engine (not shown). The engine serves as a main on-board engine. The first motor generator 40a, the second motor generator 40b, and the engine are connected by a power splitter mechanism (not shown). An output shaft of the second motor generator 40b is connected to a drive wheel. According to the present embodiment, the same permanent magnet synchronous motor as the motor generator 40 according to the above-described first embodiment is used for the motor generators 40a and 40b.

Input sides of the first inverter 30a and the second inverter 30b are connected to the positive electrode bus Lp and the negative electrode bus Ln. The first motor generator 40a is connected to the first inverter 30a. The first motor generator 40a is connected to the engine via the power splitter mechanism, and serves as a power generator and a starter for the engine. The second motor generator 40b is connected to the second inverter 30b. The second motor generator 40b serves as a main on-board engine or the like in a manner similar to the motor generator 40 according to the above-described first embodiment. Therefore, according to the present embodiment, the maximum value of a phase current flowing to the second motor generator 40b is greater than the maximum value of a phase current flowing to the first motor generator 40a. The configurations of the inverters 30a and 30b are similar to the configuration of the inverter 30 according to the above-described first embodiment. Therefore, detailed descriptions thereof are omitted.

The control system includes a first phase current detecting unit 70a, a second phase current detecting unit 70b, a first angle detecting unit 71a a second angle detecting unit 71b, and a reactor current detecting unit 75. The first and second phase current detecting units 70a and 70b respectively detect the currents of at least two phases among the phase currents flowing to the first and second motor generators 40a and 40b. The first and second angle detecting units 71a and 17b respectively detect the electrical angles θe1 and θe2 of the first and second motor generators 40a and 40b. The reactor current detecting unit 75 detects the current flowing to the reactor 22.

The detection values of the detecting units are inputted to the motor control apparatus 50. The motor control apparatus 50 operates the first inverter 30a to control the torque of the first motor generator 40a to a first command torque Trq1*. The motor control apparatus 50 also operates the second inverter 30b to control the torque of the second motor generator 40b to a second command torque Trq2*. The first and second command torques Trq1* and Trq2* are inputted from the high-order control apparatus 60.

The motor control apparatus 50 operates the first inverter 30a based on the detection values of the first phase current detecting unit 70a and the first angle detecting unit 71a. The motor control apparatus 50 operates the second inverter 30b based on the detection values of the second phase current detecting unit 70b and the second angle detecting unit 71b. In a manner similar to that according to the above-described first embodiment, the inverters 30a and 30b are operated by a PWM process using carrier signals.

According to the present embodiment, the converter carrier frequency fcnv is set to a fixed value in a manner similar to that according to the above-described first embodiment. In addition, according to the present embodiment, the inverter carrier signal used for control of the first inverter 30*a* is referred to as a first inverter carrier signal Sinv1. The inverter carrier signal used for control of the second inverter 30*b* is referred to as a second inverter carrier signal Sinv2. Furthermore, the frequency of the first inverter carrier signal Sinv1 is referred to as a first inverter carrier frequency finv1. The frequency of the second inverter carrier signal Sinv2 is referred to as a second inverter carrier frequency finv2. According to the present embodiment, the first inverter carrier frequency finv1 is set to a fixed value. The methods for operating the first and second inverters 30*a* and 30*b* are similar to the method for operating the inverter 30 according to the above-described first embodiment. Therefore, detailed descriptions thereof are omitted.

According to the present embodiment, the harmonic components superimposed on the bus voltage in accompaniment with the on-off operations of the switches configuring the first inverter 30*a* will be referred to as inverter bus harmonic components. According to the present embodiment, closeness between the second inverter carrier frequency finv2 and the frequencies of the inverter bus harmonic components, in addition to the frequencies of the DC bus harmonic components, is prevented. Hereafter, the necessity for preventing closeness between the second inverter carrier frequency finv2 and the frequencies of the inverter bus harmonic components will be described.

Figure 19A:
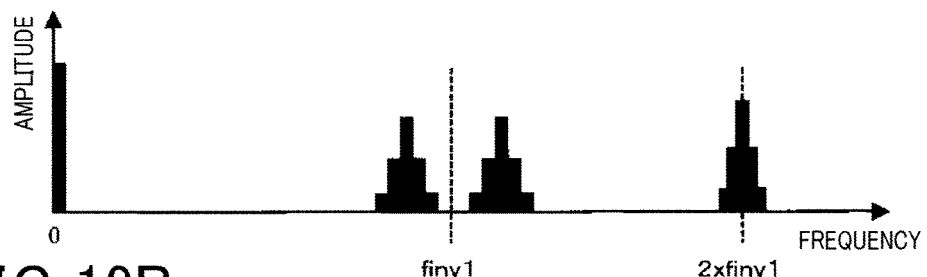
FIGS. 19A and 19B are diagrams of a spectrum of bus harmonic components attributed to a first inverter and a spectrum of switch harmonic components of a second inverter.
Figure 19B:
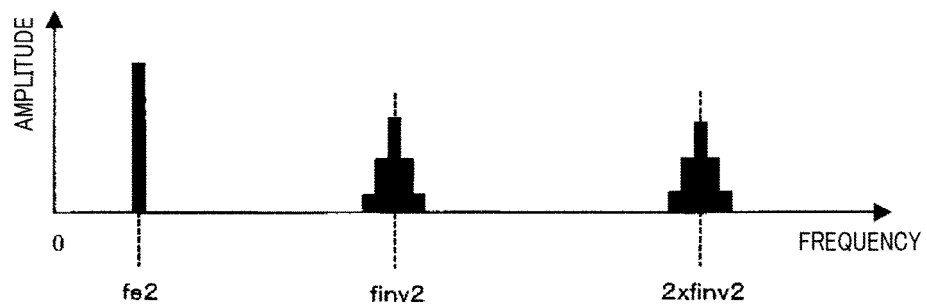

FIG. 19A shows a spectrum of the fluctuation components superimposed on the bus voltage in accompaniment with driving of the first inverter 30*a*. FIG. 19B shows a spectrum of the fluctuation components included in a switching pattern used in the second inverter 30*b*. In FIG. 19A, a spectrum of the fluctuation components superimposed on the bus voltage accompanying driving of the DC-DC converter 20 is omitted.

As shown in FIG. 19A, when the inverter 30*a* is driven by the PWM process, the inverter bus harmonic components generated in accompaniment with the driving of the inverter 30*a* are distributed mainly around sideband waves that are centered around the first inverter carrier frequency finv1 and a frequency that is twice the first inverter carrier frequency finv1.

Meanwhile, as shown in FIG. 19B, the switch harmonic components included in the switching pattern of the second inverter 30*b* are distributed mainly around the integral multiples of the second inverter carrier frequency finv2. In FIG. 19B, the frequency of a second fundamental component that is the fundamental component included in the switching pattern is indicated by fe2.

When the frequency of an inverter bus harmonic component and the frequency of a switch harmonic component become close, as described according to the above-described first embodiment, the phase voltage of the second inverter 30*b* includes low-order fluctuation components as described according to the above-described first embodiment. As a result, a problem occurs in that torque fluctuation in the second motor generator 40*b* increases. To solve this problem, the motor control apparatus 50 variably sets the second inverter carrier frequency finv2 such that the second inverter carrier frequency finv2 is not close the frequencies of the DC bus harmonic components and the inverter bus harmonic components.

FIG. 20 shows the steps in a process for setting the second inverter carrier frequency finv2. For example, the process is repeatedly performed by the motor control apparatus 50 at a predetermined cycle.

In this series of processes, first, at step S80, the motor control apparatus 50 estimates the spectrum of the DC bus harmonic components generated in accompaniment with the driving of the DC-DC converter 20. According to the present embodiment, the motor control apparatus 50 estimates the spectrum of the DC bus harmonic components based on the converter carrier frequency fcnv, the output voltage VHr, and the input voltage VLr. The estimation method is based on a model of the DC-DC converter 20 shown in FIG. 21. In the model, a constant-current power supply is connected to the output side of the DC-DC converter 20.

Figure 21:
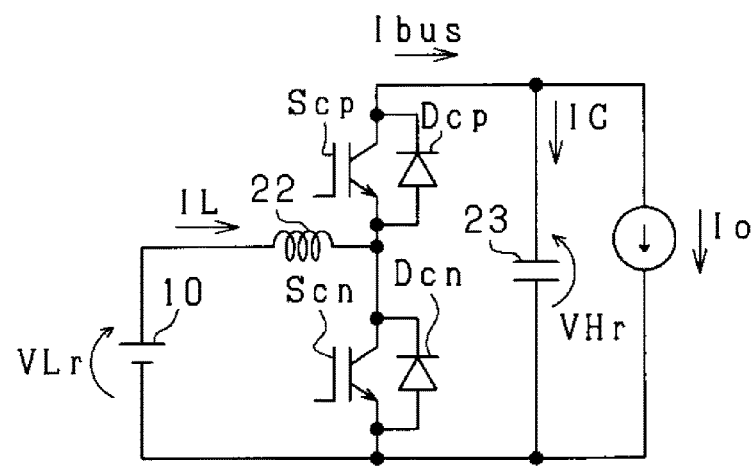
FIG. 21 is a diagram of a model for calculating a bus harmonic component attributed to a DC-DC converter.

In FIG. 21, a bus current flowing from the collector of the upper arm transformer switch Scp to the positive electrode bus Lp is indicated by Ibus. A current flowing to the second capacitor 23 is indicated by IC. A load current outputted from the constant-current power supply is indicated by Io. A current IL flowing to the reactor 22 is expressed by an expression (eq2) below.

$$IL = \frac{1}{L}\int VLr \cdot dt \quad (Sc = 0) \\ IL = -\frac{1}{L}\int (VHr - VLr) \cdot dt \quad (Sc = 1)$$ (eq 2)

In the expression (eq2) above, L denotes an inductance of the reactor 22. "Sc=0" indicates a state in which the upper-arm transformer switch Scp is turned off and the lower-arm transformer switch Scn is turned on. "Sc=1" indicates a state in which the upper-arm transformer switch Scp is turned on and the lower-arm transformer switch Scn is turned off.

The bus current Ibus is expressed by an expression (eq3) below.

$$Ibus = Sc \cdot IL$$ (eq3)

The current IC flowing to the second capacitor 23 is expressed by an expression (eq4) below.

$$IC = Ibus - Io = Sc \cdot IL - Io$$ (eq4)

A bus voltage Vbus is expressed by an expression (eq5) below.

$$Vbus = \frac{1}{C}\int IC \cdot dt = \frac{1}{C}\int (Sc \cdot IL - Io) \cdot dt$$ (eq 5)

In the expression (eq5) above, C denotes a capacitance of the second capacitor 23. The fluctuation frequency of the bus voltage Vbus expressed in the expression (eq5) above is dependent on Sc. The frequency of Sc is determined by the converter carrier frequency fcnv. Therefore, in the spectrum of the DC bus harmonic components, the frequencies at which the DC bus harmonic components are distributed can be calculated based on the converter carrier frequency fcnv. In addition, based on the expressions (eq2) and (eq5) above, the amplitude of the DC bus harmonic component is dependent on the output voltage VHr and the input voltage VLr. Therefore, the amplitude of the DC bus harmonic component can be calculated based on the output voltage VHr and the input voltage VLr. The load current Io may be used to calculate the amplitude of the DC bus harmonic component. For example, the load current Io may be calculated based on the detection values of the phase current detecting unit 70.

Returning to the description of FIG. 20 given above, at subsequent step S82, the motor control apparatus 50 estimates the spectrum of the inverter bus harmonic components generated in accompaniment with the driving of the first inverter 30*a*. According to the present embodiment, the motor control apparatus 50 estimates the spectrum of the inverter bus harmonic components based on a first electrical angular frequency ωs1 that is the electrical angular frequency of the first motor generator 40a, the phase current detected by the first phase current detecting unit 70a, a power factor of the first inverter 30a, and the switching pattern used to control the first inverter 30a. According to the present embodiment, the power factor refers to the phase difference between the switching pattern and the phase current. The first electrical angular frequency ωs1 is calculated based on the detection value of the first angle detecting unit 71a. The switching pattern can be calculated based on the first inverter carrier frequency finv1, a first command modulation factor that is a command modulation factor used to control the first inverter 30a, and the modulation method used to control the first inverter 30a. The above-described estimation method is based on the model of the first inverter 30a shown in FIG. 22. In the model, a constant-current power supply is connected in parallel to the second capacitor 23.

Figure 22:
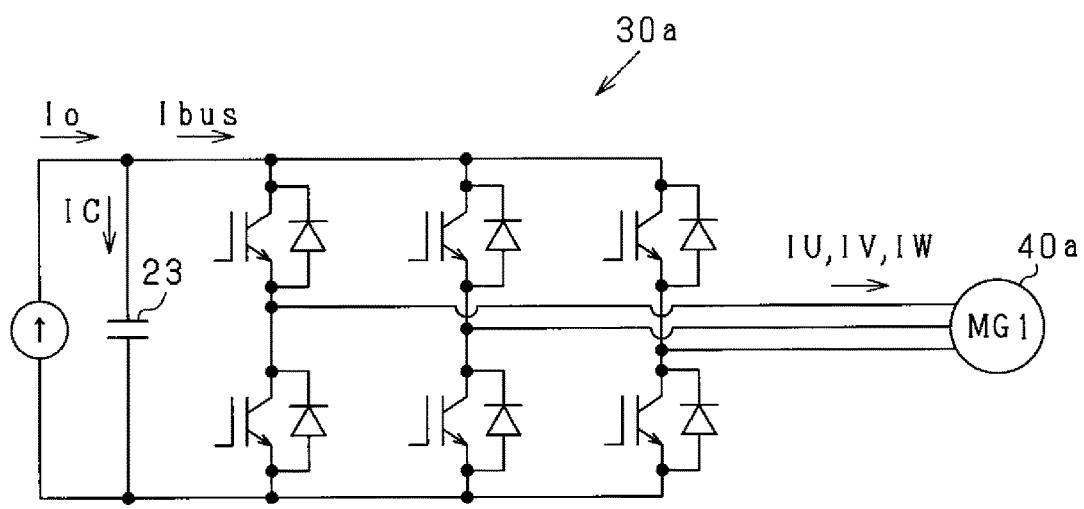
FIG. 22 is a diagram of a model for calculating a bus harmonic component attributed to an inverter.

In FIG. 22, a load current outputted from the constant-current power supply is indicated by Io. Of the load current Io, the current flowing to the second capacitor 23 is indicated by IC. Of the load current Io, the bus current flowing towards the first inverter 30a side, of the load current Io is indicated by Ibus. The bus current Ibus is expressed by an expression (eq6) below.

$$Ibus \approx Su \cdot Iu + Sv \cdot Iv + Sw \cdot Iw \qquad (eq6)$$

In the expression (eq6) above, "Sx=0" indicates a state in which an x-phase upper arm switch Sxp is turned off and an x-phase lower arm switch Sxn is turned on. "Sx=1" indicates a state in which the x-phase upper arm switch Sxp is turned on and the x-phase lower arm switch Sxn is turned off.

The current IC flowing to the second capacitor 23 is expressed by an expression (eq7) below.

$$IC = Io - Ibus \qquad (eq\ 7)$$
$$= Io - Su \cdot Iu - Sv \cdot Iv - Sw \cdot Iw$$

The bus voltage Vbus is expressed by an expression (eq8) below.

$$Vbus = \frac{1}{C}\int IC \cdot dt = \frac{1}{C}\int (Io - Su \cdot Iu - Sv \cdot Iv - Sw \cdot Iw) \cdot dt \qquad (eq\ 8)$$

As shown in the expression (eq8) above, the fluctuation frequency of the bus voltage Vbus is dependent on the products of Su, Sv, and Sw and the phase currents Iu, Iv, and Iw. Here, the phase current flows via the first motor generator 40a that is an inductive load. Therefore, it is thought that the harmonic amplitude generated in the phase current becomes smaller in relation to the harmonic amplitude included in the phase voltage as the frequency increases. In the harmonics, the harmonic component generated in the phase current is considered to be sufficiently small in comparison to the harmonic component of the phase current at the same frequency. Therefore, the fluctuation frequency of the inverter bus harmonic component can be expressed by "frequency distribution of the harmonic component included in Sx±frequency of the phase current," assuming that the fluctuation frequency of the inverter bus harmonic components indicate fluctuation in only the first order harmonic component in the phase current. Therefore, the detected phase current and the switching pattern are used to estimate the spectrum.

The amplitude of the inverter bus harmonic component can be calculated based on the detected phase current and the value of the capacitance of the second capacitor 23, in addition to the Su, Sv, and Sw as the switching pattern. In addition, a parameter other than the amplitude of the bus harmonic component including Sx may be calculated using a fixed value. Here, as the fixed value, a power factor angle that is the phase difference between Sx and the phase current Ix, the phase current amplitude, and the capacitance can be set under a supposition that the amplitude of the bus harmonic component is set to a worst value. According to the present embodiment, the processes at step S80 and S82 correspond to a bus harmonics acquiring unit.

Returning to the description of FIG. 20 given above, at subsequent step S84, the motor control apparatus 50 estimates the spectrum of the switch harmonic components included in the switching pattern based on a second electrical angular frequency ωs2 that is the electrical angular frequency of the second motor generator 40b and the switching pattern used to control the second inverter 30b. The second electrical angular frequency ωs2 is calculated based the detection value of the second angle detecting unit 71b.

At subsequent step S86, the motor control apparatus 50 determines whether or not a frequency that is close to the frequencies of the DC bus harmonic components estimated in the process at step S80 and the frequencies of the inverter harmonic components estimated in the process at step S82 is present among the frequencies of the switch harmonic components estimated in the process at step 84.

According to the present embodiment, the motor control apparatus 50 determines that a switch harmonic component that is close to the frequency of a DC bus harmonic component is present when determined that a switch harmonic component of which the frequency is higher than a value obtained by a first predetermined value Δf1 being subtracted from the converter carrier frequency fcnv and lower than the value obtained by the first predetermined value Δf1 being added to the converter carrier frequency fcnv is present.

In addition, the motor control apparatus 50 determines that a switch harmonic component that is close to the frequency of an inverter bus harmonic component is present when determined that a switch harmonic component of which the frequency is higher than a value obtained by a second predetermined value Δf2 (Δf2>Δf1) being subtracted from the converter carrier frequency fcnv and lower than a value obtained by the second predetermined value Δf2 being added to the converter carrier frequency fcnv is present.

According to the present embodiment, the first predetermined value Δf1 is adapted in advance to a value at which the DC bus harmonic components do not cause fluctuations in the output power of the inverter 30b. Specifically, for example, the first predetermined value Δf1 may be adapted to a value at which the frequency bands of the DC bus harmonic components distributed mainly around the integral multiples of the converter carrier frequency fcnv and the frequency bands of the switch harmonic components distributed mainly around the integral multiples of the second inverter carrier frequency finv2 do not overlap.

In addition, according to the present disclosure, the second predetermined value Δf2 is adapted in advance to a value at which the inverter bus harmonic components do not cause fluctuations in the output power of the inverter 30b. Specifically, for example, the second predetermined value Δf2 may be adapted to a value at which the frequency bands of the inverter bus harmonic components distributed mainly around the integral multiples of the first inverter carrier frequency finv1 as sideband waves and the frequency bands of the switch harmonic components distributed mainly around the integral multiples of the second inverter carrier frequency finv2 do not overlap.

When determined that a switch harmonic component that is close to the frequency of a DC harmonic component and the frequency of an inverter harmonic component is present at step S86, the motor control apparatus 50 proceeds to step S88 and determines whether or not a logical product of a first condition and a second condition is true. The first condition is that the amplitude of the switch harmonic component determined to be close to at least one of the DC bus harmonic component and the inverter bus harmonic component is greater than a first predetermined amplitude Ath1. The second condition is that the amplitude of at least one of the DC bus harmonic component and the inverter bus harmonic component determined to be close to the switch harmonic component is greater than a second predetermined amplitude Ath2.

When determined NO at step S86 or S88, the motor control apparatus 50 generates the operating signal of each switch configuring the second inverter 30b by a method similar to the method for controlling the inverter 30 described according to the above-described first embodiment.

Meanwhile, when determined YES at step S88, the motor control apparatus 50 proceeds to step S90. At step S90, the motor control apparatus 50 changes at least one of the second inverter carrier frequency finv2, a second command modulation factor Mr2 used to control the second inverter 30b, the modulation method used to control the second inverter 30b, and the command output voltage VH*. As a result, the spectrum of the switch harmonic component is changed.

Figure 23:
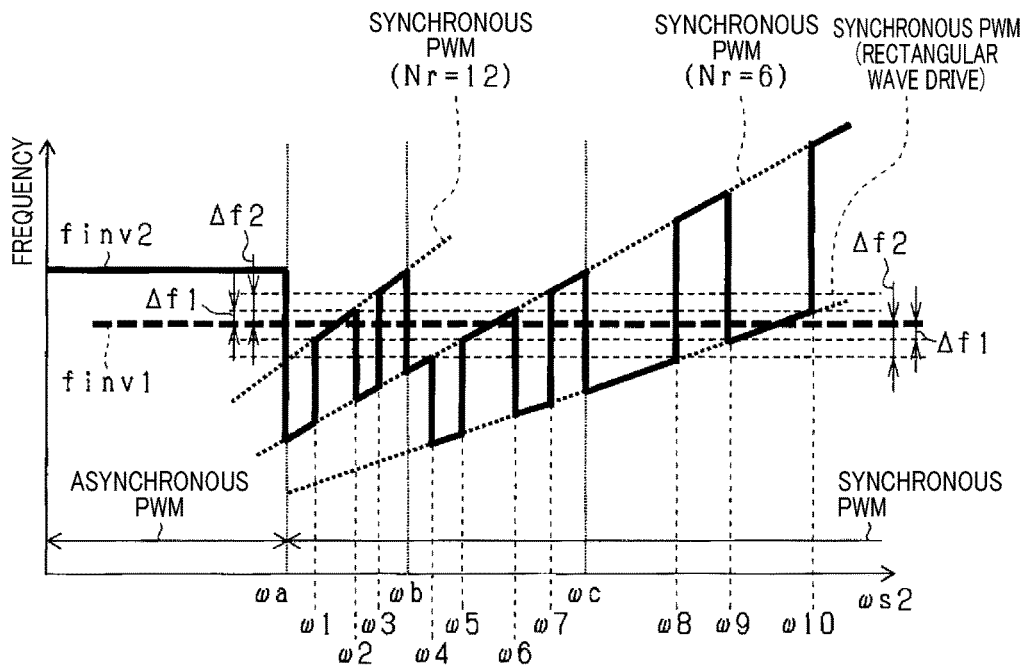
FIG. 23 is a diagram of a mode in which a carrier frequency of a second inverter is changed.

FIG. 23 shows an example of a process for setting the second inverter carrier frequency finv2. In the example shown in FIG. 23, the amplitude of the DC bus harmonic component that is close to the switch harmonic component is determined to be equal to or less than the second predetermined amplitude Ath2. Therefore, even when the second inverter carrier frequency finv2 is in the range of "finv1−Δf1" to "finv1+Δf1," the motor control apparatus 50 determines NO at step S88 in FIG. 20. First to sixth predetermined angular frequencies ω1 to ω6 shown in FIG. 23 differ from the first to sixth predetermined angular frequencies ω1 to ω6 shown in FIG. 5 described above.

First, a case in which the asynchronous PWM process is performed will be described. When the second electrical angular frequency ωs2 is determined to be equal to or lower than the first switchover angular frequency ωa, the motor control apparatus 50 sets the second inverter carrier frequency finv2 to a value that is equal to or greater than the value obtained by the first inverter carrier frequency finv1 and the second predetermined value Δf2 being added. According to the present embodiment, the second inverter carrier frequency finv2 is a value that is greater than the value obtained by the first inverter carrier frequency finv1 and the second predetermined value Δf2 being added.

Next, a case in which the synchronous PWM process is performed will be described. When the second electrical angular frequency ωs2 is determined to be higher than the first switchover angular frequency ωa and equal to or lower than the second switchover angular frequency ωb, the motor control apparatus 50 basically sets the second inverter carrier frequency finv2 such that the number of synchronizations Nr is 12. However, when the second electrical angular frequency ωs2 is higher than the first switchover angular frequency ωa and lower than the first predetermined angular frequency ω1, and when the second electrical angular frequency ωs2 is higher than the second predetermined angular frequency ω2 and lower than the third predetermined angular frequency ω3, the motor control apparatus 50 sets the second inverter carrier frequency finv2 such that the number of synchronizations Nr is 6, instead of the synchronous PWM process in which the number of synchronizations Nr is 12. As a result, the inverter carrier frequencies finv1 and finv2 are prevented from becoming close.

The first predetermined angular frequency ω1 is an angular frequency at which the second inverter carrier frequency finv2 at which the number of synchronizations Nr is 12 matches the value obtained by the first predetermined value Δf1 being subtracted from the first inverter carrier frequency fcnv1. The second predetermined angular frequency ω2 is an angular frequency at which the second inverter carrier frequency finv2 at which the number of synchronizations Nr is 12 matches the value obtained by the first inverter carrier frequency fcnv1 and the first predetermined value Δf1 being added. The third predetermined angular frequency ω3 is an angular frequency at which the second inverter carrier frequency finv2 at which the number of synchronizations Nr is 12 matches the value obtained by the first inverter carrier frequency fcnv1 and the second predetermined value Δf2 being added.

When the second electrical angular frequency ωs2 is determined to be higher than the second switchover angular frequency ωb and equal to or lower than the third switchover angular frequency ωc, the motor control apparatus 50 basically sets the second inverter carrier frequency finv2 such that the number of synchronizations Nr is 6. However, when the second electrical angular frequency ωs2 is higher than the fourth predetermined angular frequency ω4 and lower than the fifth predetermined angular frequency ω5, and the second electrical angular frequency ωs2 is higher than the sixth predetermined angular frequency ω6 and lower than a seventh predetermined angular frequency ω7, the motor control apparatus 50 sets the second inverter carrier frequency finv2 such that the number of synchronizations Nr is changed from 6 to 1.

The fourth predetermined angular frequency ω4 is an angular frequency at which the second inverter carrier frequency finv2 at which the number of synchronizations Nr is 6 matches the value obtained by the second predetermined value Δf2 being subtracted from the first inverter carrier frequency fcnv1. The fifth predetermined angular frequency ω5 is an angular frequency at which the second inverter carrier frequency finv2 at which the number of synchronizations Nr is 6 matches the value obtained by the first predetermined value Δf1 being subtracted from the first inverter carrier frequency fcnv1. The sixth predetermined angular frequency ω6 is an angular frequency at which the second inverter carrier frequency finv2 at which the number of synchronizations Nr is 6 matches the value obtained by the first inverter carrier frequency fcnv1 and the first predetermined value Δf1 being added. The seventh predetermined angular frequency ω7 is an angular frequency at which the second inverter carrier frequency finv2 at which the number of synchronizations Nr is 6 matches the value obtained by the first inverter carrier frequency fcnv1 and the second predetermined value Δf2 being added.

When the second electrical angular frequency ωs2 is determined to be higher than the third switchover angular frequency ωc, the motor control apparatus 50 basically sets the second inverter carrier frequency finv2 such that the number of synchronizations Nr is 1. However, when the second electrical angular frequency ωs2 is higher than an eighth predetermined angular frequency ω8 and lower than a ninth predetermined angular frequency ω9, and when the second electrical angular frequency ωs2 is higher than a tenth predetermined angular frequency ω10, the motor control apparatus 50 sets the second inverter carrier frequency finv2 such that the number of synchronizations Nr is changed from 1 to 6.

The eighth predetermined angular frequency ω8 is an angular frequency at which the second inverter carrier frequency finv2 at which the number of synchronizations Nr is 1 matches the value obtained by the second predetermined value Δf2 being subtracted from the first inverter carrier frequency fcnv1. The ninth predetermined angular frequency ω9 is an angular frequency at which the second inverter carrier frequency finv2 at which the number of synchronizations Nr is 1 matches the value obtained by the first predetermined value Δf1 being subtracted from the first inverter carrier frequency fcnv1. The tenth predetermined angular frequency ω10 is an angular frequency at which the second inverter carrier frequency finv2 at which the number of synchronizations Nr is 1 matches the value obtained by the first inverter carrier frequency fcnv1 and the first predetermined value Δf1 being added.

According to the present embodiment described above, increase in torque fluctuation in the second motor generator 40b attributed to harmonic components superimposed on the bus voltage in accompaniment with the driving of the first inverter 30a, in addition to the driving of the DC-DC converter 20, can be suppressed.

Ninth Embodiment

A ninth embodiment will be described below with reference to the drawings. Differences from the above-described eighth embodiment will mainly be described. According to the present embodiment, the first and second inverters 30a and 30b are driven using pulse patterns in a manner similar to that according to the above-described sixth embodiment.

The motor control apparatus 50 variably sets the second inverter carrier frequency finv2 such that the second inverter carrier frequency finv2 is not close the frequencies of the DC bus harmonic components and the inverter bus harmonic components attributed to the driving of the first inverter 30a.

Figure 24A:
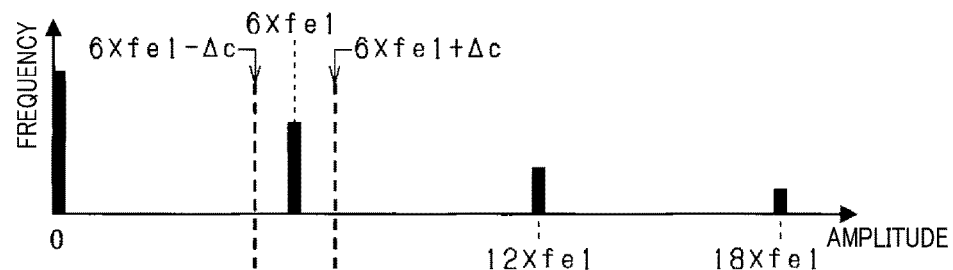
FIGS. 24A and 24B are diagrams of a spectrum of bus harmonic components attributed to a first inverter and a spectrum of switch harmonic components of a second inverter, according to a ninth embodiment.

FIG. 24A shows a spectrum of the inverter bus harmonic components generated in accompaniment with the driving of the first inverter 30a.

The fluctuation frequencies of the bus voltage accompanying the driving of the first inverter 30a are distributed around the multiples of 3 of a frequency fe1 of a first fundamental component that is the fundamental component included in the output voltage of the first inverter 30a. In particular, when the first inverter 30a is driven using the pulse pattern that has symmetry shown in FIG. 12 described above, the fluctuation frequencies are distributed at multiples of 6 of the frequency fe1 of the first fundamental component.

Meanwhile, the switch harmonic components included in the command pattern used to control the second inverter 30b are distributed at the integral multiples of the fundamental component included in the command pattern. In particular, when the second inverter 30b is driven using the pulse pattern that has symmetry shown in FIG. 12 described above, the switch harmonic components are distributed at odd-numbered multiples of the fundamental component as shown in FIG. 24B.

Figure 24B:
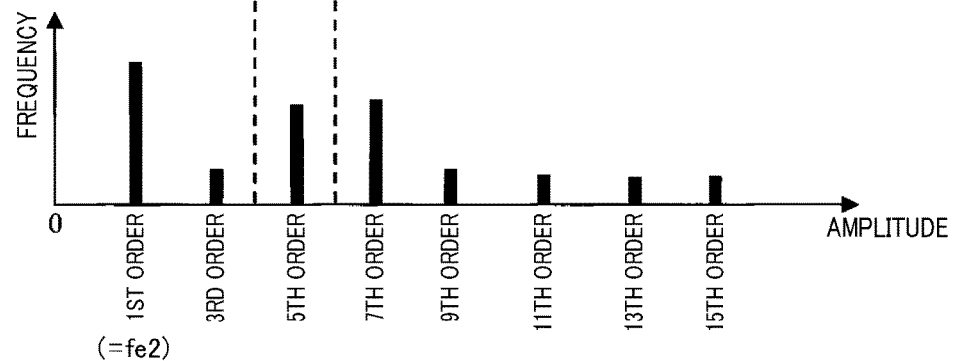

In the examples shown in FIGS. 24A and 24B, a state in which the ratio of the first electrical angular frequency of the first inverter 30a to the second electrical angular frequency of the second inverter 30b is 5:6, and the inverter bus harmonic component and the switch harmonic component are close is shown. In this case, the above-described low-frequency harmonic components are superimposed on the output voltage of the second inverter and torque fluctuation in the second motor generator 40b increases.

To solve this issue, the motor control apparatus 50 sets the above-described command pattern such that the absolute value of the difference between the frequency of the inverter bus harmonic component and the frequency fpt of the switch harmonic component included in the command pattern used to control the second inverter 30b is equal to or greater than the predetermined value Δf.

The motor control apparatus 50 sets the command pattern such that the absolute value of the difference between the converter carrier frequency fcnv and the frequency fpt of the switch harmonic component is also equal to or greater than the predetermined value Δf.

The motor control apparatus 50 performs a process similar to the process shown in FIG. 20 described above. Specifically, at step S82, the motor control apparatus 50 estimates the spectrum of the inverter bus harmonic components based on the command pattern used to control the second inverter 30b. In addition, at step S84, the motor control apparatus 50 estimates the spectrum of the switch harmonic components based on the command pattern used to control the second inverter 30b. Specifically, for example, at steps S82 and S84, the motor control apparatus 50 estimates the spectrums of the harmonic components by performing a Fourier transform on the command pattern or by using information regarding pattern design.

Figure 25:
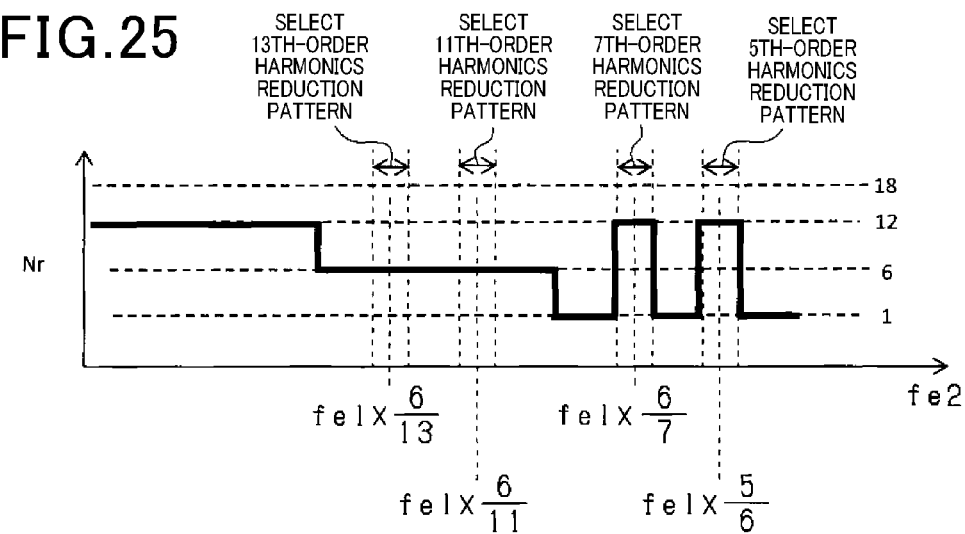
FIG. 25 is a diagram of a mode in which a pulse pattern is changed.
Figure 26:
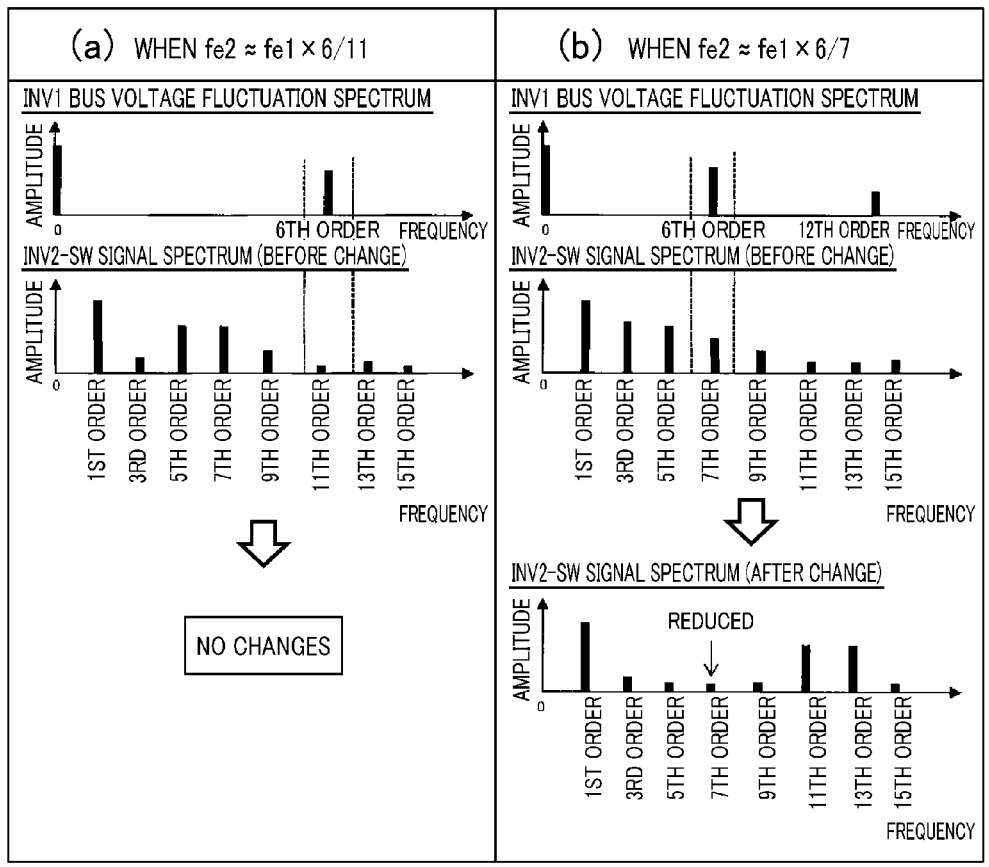
FIG. 26 illustrate, by (a) and (b), a diagram of a spectrum of bus harmonic components of the first inverter and a spectrum of switch harmonic components of the second inverter.

FIGS. 25 and 26 show specific examples of a method for changing the number of synchronizations Nr used to select the pulse pattern of the second inverter 30b to change the spectrum of the switch harmonic components.

As shown in FIG. 25, when determined that a frequency of a 13-th order switch harmonic component, which is expressed by fe1×6/13, and the frequency fe1 of the first fundamental component of the first inverter 30a are close, the motor control apparatus 50 does not perform selection of a pulse pattern in which the number of synchronizations Nr is changed. In addition, when determined that a frequency of an 11-th order switch harmonic component, which is expressed by fe1×6/11, and the frequency fe1 of the first fundamental component of the first inverter 30a are close, the motor control apparatus 50 does not perform selection of a pulse pattern in which the number of synchronizations Nr is changed. A reason for this is that, as shown in FIG. 26 by (a), the amplitude of the 13-th order switch harmonic component is equal to or less than the predetermined amplitude Ath1 even without the number of synchronizations Nr being changed.

When determined that a frequency of a 7-th order switch harmonic component, which is expressed by fe1×6/7, and the frequency fe1 of the first fundamental component of the first inverter 30a are close, the motor control apparatus 50 selects a pulse pattern in which the number of synchronizations Nr is 12 instead of the pulse pattern in which the number of synchronization Nr is 1. As a result, as shown in FIG. 26 by (b), the amplitude of the 7th-order switch harmonic component included in the command pattern is equal to or less than the first predetermined amplitude Ath1. In addition, when determined that a frequency of a 5-th order switch harmonic component, which is expressed by fe1×6/5, and the frequency fe1 of the first fundamental component of the first inverter 30a are close, the motor control apparatus 50 selects a pulse pattern in which the number of synchronizations Nr is 12 instead of the pulse pattern in which the number of synchronization Nr is 1.

As described above, effects similar to those according to the above-described eighth embodiment can also be achieved in a configuration in which the pulse pattern is used.

Tenth Embodiment

A tenth embodiment will be described below with reference to the drawings. Differences from the above-described ninth embodiment will mainly be described. According to the above-described ninth embodiment, closeness between the frequencies of the DC bus harmonic components and the inverter bus harmonic components, and the frequencies of the switch harmonic components is prevented by the pulse pattern used to control the second inverter 30b being changed. According to the present embodiment, closeness is prevented by a rotation speed of at least one of the first and second motor generators 40a and 40b being changed.

That is, when either of the first and second inverters 30a and 30b is driven in a driving mode other than the rectangular wave drive and is driven based on a pulse pattern that has symmetry, the frequencies of the inverter bus harmonic components and the frequencies of the switch harmonic components become close, even when the first and second electrical angular frequencies are, for example, ωs1:ωs2=1:12, ωs1:ωs2=1:24, ωs1:ωs2=5:12, ωs1:ωs2=5:24, ωs1:ωs2=7:12, or ωs1:ωs2=7:24. In this case as well, a problem in that torque fluctuation increases occurs. In general terms, the problem in that torque fluctuation increases occurs when ωs1:ωs2=2N−1:6M, that is, fe1:fe2=2N−1:6M, where N and M are integers of 1 or greater. According to the present embodiment, this problem is solved by the rotation speed of at least one of the first and second motor generators 40a and 40b being changed.

FIG. 27 shows the steps in a process for changing the rotation speed. For example, the process is repeatedly performed by the motor control apparatus 50 at a predetermined cycle. Processes in FIG. 27 that are identical to the processes in FIG. 20 described above are given the same reference numbers for convenience.

In this series of processes, when determined YES at step S88, the motor control apparatus 50 proceeds to step S92. At step S92, the motor control apparatus 50 determines whether or not the ratio of the frequency fe1 of the first fundamental component to the frequency f2 of the second fundamental component is fe1:fe2=2N−1:6M based on the first and second electrical angular frequencies ωs1 and ωs2.

When determined YES at step S92, the motor control apparatus 50 changes the rotation speed of at least one of the first and second motor generators 40a and 40b. As a result, the ratio of the frequency fe1 of the first fundamental component to the frequency f2 of the second fundamental component does not become fe1:fe2=2N−1:6M. Consequently, closeness between the frequency of the inverter bus harmonic component and the frequency of the switch harmonic component is prevented.

According to the present embodiment described above, as well, increase in torque fluctuation in the second motor generator 40b can be suppressed.

Other Embodiments

The above-described embodiments may be modified in the following manner.

The subject executing the process shown in FIG. 27 according to the above-described tenth embodiment may be the high-order control apparatus 60 instead of the motor control apparatus 50.

Instead of the configurations according to the above-described first and second embodiments, the inverter carrier frequency finv and the converter carrier frequency fcnv may both be variably set such that the absolute value of the difference between the carrier frequencies finv and fcnv is equal to or greater than the predetermined value Δf.

At step S16 in FIG. 7, the method for determining whether or not the frequencies of the DC bus harmonic components and the frequencies of the switch harmonic components are close may be changed in the following manner. The spectrum of the bus voltage is estimated by a Fourier transform being performed on the output voltage VHr detected by the high-voltage detecting unit 74. In addition, the spectrum of the PWM signal is estimated by a Fourier transform being performed on at least one of the U-phase PWM signal GU, the V-phase PWM signal GV, and the W-phase PWM signal GW. Then, the frequencies of the DC bus harmonic components and the switch harmonic components are acquired from the spectrum estimation results. A determination is then made regarding whether or not the absolute value of the difference between the frequency of a DC bus harmonic component of which the amplitude is greater than the predetermined amplitude, among the DC bus harmonic components, and the frequency of a switch harmonic component of which the amplitude is greater than the predetermined amplitude, among the switch harmonic components is less than the predetermined value Δf.

The control system is provided with a converter temperature detecting unit that detects the temperature of the DC-DC converter 20. According to the above-described third embodiment, the converter carrier frequency fcnv may be variably set based on the converter temperature detected by the converter temperature detecting unit.

The inverter temperature used according to the above-described third and seventh embodiment is not limited to the detection value of the temperature detecting unit and may be an estimated value estimated in a predetermined temperature estimation process.

The method for estimating the DC bus harmonic components is not limited to that given as an example according to the above-described eighth embodiment. For example, the amplitudes and frequencies of the DC bus harmonic components calculated based on the inductance L, the capacitance, and the load current Io may be stored in advance in the memory. Then, the spectrum of the DC bus harmonic components may be estimated by the information stored in the memory being referenced based on the operation of the DC-DC converter 20. In addition, for example, the spectrum of the DC bus harmonic components may be estimated by a Fourier transform being performed on the output voltage VHr detected by the high-voltage detecting unit 74.

The method for estimating the amplitude of the inverter bus harmonic component is not limited to that given as an example according to the above-described eighth embodiment. For example, amplitudes associated with the first inverter carrier frequency finv1, the first command modulation factor, and the modulation method may be stored in advance in the memory. Then, the amplitude of the inverter bus harmonic component may be estimated by the information stored in the memory being referenced based on the first inverter carrier frequency finv1, the first command modulation factor, and the modulation method.

In addition, for example, the switching pattern or the phase voltage of the first inverter 30a may be acquired. Then, the amplitude of the inverter bus harmonic component may be estimated by a Fourier transform being performed on the acquired value. Furthermore, for example, the spectrum of the inverter bus harmonic components may be estimated by a Fourier transform being performed on the output voltage VHr detected by the high-voltage detecting unit 74.

In the expression (eq2) according to the above-described eighth embodiment, the current flowing to the reactor 22 is calculated based on the output voltage VHr and the input voltage VLr. However, the present disclosure is not limited thereto. The detection value of the reactor current detecting unit 75 may be used.

In FIG. 23 according to the above-described eighth embodiment, when the temperature detection value of the second inverter 30b is higher than a threshold temperature, the second inverter carrier frequency finv2 may be preferentially changed towards the low frequency side.

According to the above-described ninth embodiment, the pulse pattern used to control the first inverter 30a may be changed and the spectrum of the inverter bus harmonic components may be changed, when a determination is made that at least one of the inverter bus harmonic component of the first inverter 30a and the DC bus harmonic component, and the switch harmonic component of the second inverter 30b are close. Here, the pulse pattern is merely required to be changed to that which lowers the frequency of the switch harmonic components which is expressed by 6×fe1.

Instead of the configurations according to the above-described fourth and fifth embodiments, the spectrum of the switch harmonic components may be changed by at least two of the inverter carrier frequency finv, the modulation method, and the command output voltage VH* being changed.

The DC-DC converter is not limited to a boost converter, and may be a buck converter that decreases the input voltage and outputs the decreased voltage.

According to the above-described eighth embodiment, the DC-DC converter 20 may be eliminated, and the battery 10 may be connected to the input sides of the first and second inverters 30a and 30b. In this case, the frequencies of the DC bus harmonic components are eliminated from the subjects of determination regarding closeness to the frequencies of the switch harmonic components.

The motor control system may be a system including three or more inverters and motor generators connected to the inverters. In this case, a plurality of inverters may be subjected to estimation of the spectrum of the inverter bus harmonic components. In addition, in this case, a plurality of inverters may be such that the inverter carrier frequency is variably set to prevent closeness between the frequencies of the DC bus harmonic components and the inverter bus harmonic components.

The carrier signal is not limited to the triangular wave signal and, for example, may be a sawtooth wave signal.

The controlled variable of the motor generator is not limited to the torque and, for example, may be the rotation speed.

The motor generator is not limited to the synchronous motor and, for example, may be an induction motor. In addition, the motor generator is not limited to that used as a main on-board engine and may be that used for other purposes, such as an electric machine configuring an electric power steering apparatus.

According to the above-described first and second embodiments, the frequency of the bus harmonic component is the converter carrier frequency fcnv, and the frequency of the switch harmonic component that is to be prevented from becoming close to the frequency fcnv is the inverter carrier frequency finv. However, the present disclosure is not limited thereto. For example, the frequency of the bus harmonic component may be the converter carrier frequency fcnv and the frequency of the switch harmonic component that is to be prevented from becoming close to the frequency fcnv may be a frequency that is an integral multiple of 2 or greater of the inverter carrier frequency finv.

What is claimed is:

1. A control apparatus for a power conversion apparatus that is applied to a system including a plurality of power conversion apparatuses that convert an input voltage to a predetermined voltage by turning on and off switches and output the predetermined voltage, in which the power conversion apparatuses are electrically connected to each other by a bus, the control apparatus comprising:
   an operating unit that turns on and off the switches configuring the power conversion apparatuses; and
   a spectrum changing unit that changes a spectrum of at least one of bus harmonic components and switch harmonic components so as to meet at least one of a separation condition and a reduction condition,
      the bus harmonic components being harmonic components superimposed on a voltage of the bus in accompaniment with on-off operations of the switches configuring at least one power conversion apparatus among the plurality of power conversion apparatuses,
      the switch harmonic components being harmonic components included in a switching pattern of the switches configuring a remaining at least one power conversion apparatuses other than the at least one power conversion among the plurality of power conversion apparatuses,
      the separation condition being that a frequency of the bus harmonic component and a frequency of the switch harmonic component are separated by at least a predetermined value, and
      the reduction condition being that an amplitude of at least one of the bus harmonic component and the switch harmonic component is reduced when a difference between the frequency of the bus harmonic component and the frequency of the switch harmonic component is less than the predetermined value.

2. The control apparatus for a power conversion apparatus according to claim 1, wherein:
   the plurality of power conversion apparatuses include an inverter that converts an inputted direct-current voltage to an alternating-current voltage and outputs the alternating-current voltage, and a direct current-to-direct current converter that transforms the inputted direct-current voltage and outputs the transformed voltage;
   an input side of the inverter is connected to an output side of the direct current-to-direct current converter via the bus;
   the at least one power conversion apparatus is the direct current-to-direct current converter;

the remaining at least one power conversion apparatus is the inverter;

the operating unit has an inverter operating unit that turns on and off inverter switches that are the switches configuring the inverter by performing a pulse width modulation process using a carrier signal; and the spectrum changing unit changes the spectrum of the switch harmonic components by changing at least one of a frequency of the carrier signal and a modulation method in the pulse width modulation process.

3. The control apparatus for a power conversion apparatus according to claim 2, further comprising:

a temperature acquiring unit that acquires a temperature of the inverter, wherein the spectrum changing unit changes the spectrum of the switch harmonic components by changing the frequency of the carrier signal, and the spectrum changing unit further prohibits changing of the frequency of the carrier signal towards a high frequency side when determined that the temperature acquired by the temperature acquiring unit is higher than a threshold temperature.

4. The control apparatus for a power conversion apparatus according to claim 3, wherein:

the plurality of power conversion apparatuses include an inverter that converts an inputted direct-current voltage to an alternating-current voltage and outputs the alternating-current voltage, and a direct current-to-direct current converter that transforms the inputted direct-current voltage and outputs the transformed voltage;

an input side of the inverter is connected to an output side of the direct current-to-direct current converter via the bus;

the at least one power conversion apparatus is the direct current-to-direct current converter;

the remaining at least one power conversion apparatus is the inverter;

the operating unit has an inverter operating unit that turns on and off inverter switches that are the switches configuring the inverter;

the inverter operating unit calculates a command value of an output voltage of the inverter based on a command modulation factor of an output voltage of the direct current-to-direct current converter, and turns on and off the inverter switches by performing a pulse width modulation process based on a comparison of magnitude between the calculated command value of the output voltage and the carrier signal; and the spectrum changing unit changes the spectrum of the switch harmonic components by changing the command modulation factor.

5. The control apparatus for a power conversion apparatus according to claim 1, wherein:

the plurality of power conversion apparatuses include an inverter that converts an inputted direct-current voltage to an alternating-current voltage and outputs the alternating-current voltage, and a direct current-to-direct current converter that transforms the inputted direct-current voltage and outputs the transformed voltage;

an input side of the inverter is connected to an output side of the direct current-to-direct current converter via the bus;

the at least one power conversion apparatus is the direct current-to-direct current converter;

the remaining at least one power conversion apparatus is the inverter;

the operating unit includes an inverter operating unit that turns on and off inverter switches that are the switches configuring the inverter;

a time-series pattern prescribing a switching pattern of the inverter switches is defined as a pulse pattern;

at least one of an upper limit number-of-switching of the inverter switches per single electrical angle cycle of a fundamental component included in an output voltage of the inverter, a command modulation factor of the output voltage of the inverter, and a modulation method for the switching pattern of the inverter switches is defined as a related parameter;

the control apparatus includes a pattern storage unit that stores therein a plurality of pulse patterns associated with the related parameter, and a pattern generating unit that selects a corresponding pulse pattern among the pulse patterns stored in the pattern storage unit based on the related parameter, and generates a command pattern that is a command value of the switching pattern based on the selected pulse pattern;

the inverter operating unit turns on and off the inverter switches based on the command pattern generated by the pattern generating unit; and the spectrum changing unit changes the spectrum of the switch harmonic components by changing the related parameter.

6. The control apparatus for a power conversion apparatus according to claim 5, further comprising:

a temperature acquiring unit that acquires a temperature of the inverter, wherein the related parameter includes at least the upper limit number-of-switching, and the spectrum changing unit prohibits increasing of the upper limit number-of switching used to select the pulse pattern in the pattern generating unit when determined that the temperature acquired by the temperature acquiring unit is higher than the threshold temperature.

7. The control apparatus for a power conversion apparatus according to claim 6, wherein:

the inverter comprises a plurality of inverters;

at least one inverter of the plurality of inverters are defined as a first subject apparatus and a remaining at least one inverter are defined as a second subject apparatus;

the at least one power conversion apparatus is the direct current-to-direct current converter and the first subject apparatus, and the remaining at least one power conversion apparatus is the second subject apparatus.

8. The control apparatus for a power conversion apparatus according to claim 7, further comprising:

a bus harmonics acquiring unit that acquires a spectrum of the bus harmonic components;

a switch harmonics acquiring unit that acquires the spectrum of the switch harmonic components; and a closeness determining unit that determines whether or not the difference between the frequency of the bus harmonic component and the frequency of the switch harmonic component is less than the predetermined value based on the spectrums acquired by the bus harmonics acquiring unit and the switch harmonics acquiring unit, wherein the spectrum changing unit changes the spectrum of at least one of the bus harmonic components and the switch harmonic components under a condition that the closeness determining unit determines that the difference is less than the predetermined value.

9. The control apparatus for a power conversion apparatus according to claim 8, wherein:
the plurality of power conversion apparatuses include an inverter that converts an inputted direct-current voltage to an alternating-current voltage and outputs the alternating-current voltage, and a direct current-to-direct current converter that transforms the inputted direct-current voltage and outputs the transformed voltage;
an input side of the inverter is connected to an output side of the direct current-to-direct current converter via the bus;
the operating unit includes a converter operating unit that turns on and off converter switches that are switches configuring the direct current-to-direct current converter by performing a pulse width modulation process using a carrier signal, and
the spectrum changing unit changes the spectrum of the bus harmonic components by changing a frequency of the carrier signal in the converter operating unit.

10. The control apparatus for a power conversion apparatus according to claim 9, wherein:
the plurality of power conversion apparatuses include an inverter that converts an inputted direct-current voltage to an alternating-current voltage and outputs the alternating-current voltage, and a direct current-to-direct current converter that transforms the inputted direct-current voltage and outputs the transformed voltage;
an input side of the inverter is connected to an output side of the direct current-to-direct current converter via the bus;
the operating unit includes a converter operating unit that turns on and off converter switches that are switches configuring the direct current-to-direct current converter based on a command output voltage of the direct current-to-direct current converter; and
the spectrum changing unit changes the spectrums of the switch harmonic components and the bus harmonic components by changing a modulation factor of the inverter by changing the command output voltage.

11. The control apparatus for a power conversion apparatus according to claim 1, wherein:
the plurality of power conversion apparatuses include a plurality of inverters of which input sides are connected to the bus, and that convert an inputted direct-current voltage to an alternating-current voltage and output the alternating-current voltage;
a time-series pattern prescribing a switching pattern of inverter switches that are the switches configuring the inverters is defined as a pulse pattern;
the control apparatus includes
a pattern storage unit that stores therein a plurality of pulse patterns, and
a pattern generating unit that generates a command pattern that is a command value of the switching pattern based on the pulse patterns stored in the pattern storage unit;
the operating unit includes an inverter operating unit that turns on and off the inverter switches based on the command pattern generated by the pattern generating unit; and
the spectrum changing unit changes, when two inverters selected from the plurality of inverters is a first inverter and a second inverter, an operating mode of at least one of the first inverter and the second inverter such that fe1:fe2=2N−1:6M does not occur, when a frequency of a fundamental component included in an output voltage of the first inverter is fe1, a frequency of a fundamental component included in an output voltage of the second inverter is fe2, and N and M are integers of 1 or greater.

12. The control apparatus for a power conversion apparatus according to claim 1, wherein:
the plurality of power conversion apparatuses include an inverter that converts an inputted direct-current voltage to an alternating-current voltage and outputs the alternating-current voltage, and a direct current-to-direct current converter that transforms the inputted direct-current voltage and outputs the transformed voltage;
an input side of the inverter is connected to an output side of the direct current-to-direct current converter via the bus;
the at least one power conversion apparatus is the direct current-to-direct current converter;
the remaining at least one power conversion apparatus is the inverter;
the operating unit has an inverter operating unit that turns on and off inverter switches that are the switches configuring the inverter;
the inverter operating unit calculates a command value of an output voltage of the inverter based on a command modulation factor of an output voltage of the direct current-to-direct current converter, and turns on and off the inverter switches by performing a pulse width modulation process based on a comparison of magnitude between the calculated command value of the output voltage and a carrier signal; and
the spectrum changing unit changes the spectrum of the switch harmonic components by changing the command modulation factor.

13. The control apparatus for a power conversion apparatus according to claim 2, wherein:
the inverter comprises a plurality of inverters;
at least one inverter of the plurality of inverters are defined as a first subject apparatus and a remaining at least one inverter are defined as a second subject apparatus;
the at least one power conversion apparatus is the direct current-to-direct current converter and the first subject apparatus, and
the remaining at least one power conversion apparatus is the second subject apparatus.

14. The control apparatus for a power conversion apparatus according to claim 1, further comprising:
a bus harmonics acquiring unit that acquires a spectrum of the bus harmonic components;
a switch harmonics acquiring unit that acquires the spectrum of the switch harmonic components; and
a closeness determining unit that determines whether or not the difference between the frequency of the bus harmonic component and the frequency of the switch harmonic component is less than the predetermined value based on the spectrums acquired by the bus harmonics acquiring unit and the switch harmonics acquiring unit, wherein
the spectrum changing unit changes the spectrum of at least one of the bus harmonic components and the switch harmonic components under a condition that the closeness determining unit determines that the difference is less than the predetermined value.

15. The control apparatus for a power conversion apparatus according to claim 1, wherein:
the plurality of power conversion apparatuses include an inverter that converts an inputted direct-current voltage to an alternating-current voltage and outputs the alternating-current voltage, and a direct current-to-direct current converter that transforms the inputted direct-current voltage and outputs the transformed voltage;

an input side of the inverter is connected to an output side of the direct current-to-direct current converter via the bus;

the operating unit includes a converter operating unit that turns on and off converter switches that are switches configuring the direct current-to-direct current converter by performing a pulse width modulation process using a carrier signal, and the spectrum changing unit changes the spectrum of the bus harmonic components by changing a frequency of the carrier signal in the converter operating unit.

16. The control apparatus for a power conversion apparatus according to claim 1, wherein:

the plurality of power conversion apparatuses include an inverter that converts an inputted direct-current voltage to an alternating-current voltage and outputs the alternating-current voltage, and a direct current-to-direct current converter that transforms the inputted direct-current voltage and outputs the transformed voltage;

an input side of the inverter is connected to an output side of the direct current-to-direct current converter via the bus;

the operating unit includes a converter operating unit that turns on and off converter switches that are switches configuring the direct current-to-direct current converter based on a command output voltage of the direct current-to-direct current converter; and the spectrum changing unit changes the spectrums of the switch harmonic components and the bus harmonic components by changing a modulation factor of the inverter by changing the command output voltage.

* * * * *